United States Patent
Ouchi

(10) Patent No.: US 6,442,594 B1
(45) Date of Patent: Aug. 27, 2002

(54) WORKFLOW SYSTEMS AND METHODS

(75) Inventor: Norman Ken Ouchi, San Jose, CA (US)

(73) Assignee: Solectron Corporation, Milpitas, CA (US)

( * ) Notice: Subject to any disclaimer, the term of this patent is extended or adjusted under 35 U.S.C. 154(b) by 0 days.

(21) Appl. No.: 09/417,280

(22) Filed: Oct. 13, 1999

Related U.S. Application Data

(62) Division of application No. 08/901,539, filed on Jul. 28, 1997, now Pat. No. 5,978,836.

(51) Int. Cl.[7] ..................... G06F 15/16; G06F 15/173

(52) U.S. Cl. .................... 709/206; 709/207; 709/238

(58) Field of Search ............................ 709/206, 207, 709/203, 217, 219, 239, 238; 370/351

(56) References Cited

U.S. PATENT DOCUMENTS

| | | |
|---|---|---|
| 4,503,499 A | 3/1985 | Mason et al. |
| 4,799,156 A | 1/1989 | Shavit et al. ................. 705/26 |
| 5,040,142 A | 8/1991 | Mori et al. |
| 5,113,393 A | 5/1992 | Kam et al. |
| 5,182,705 A | 1/1993 | Barr et al. ..................... 705/11 |
| 5,191,522 A | 3/1993 | Bosco et al. ................... 705/4 |
| 5,311,428 A | 5/1994 | Sellers et al. ................. 700/96 |

(List continued on next page.)

FOREIGN PATENT DOCUMENTS

| | | |
|---|---|---|
| EP | 91401268.7 | 11/1991 |
| EP | 95114678.6 | 3/1996 |
| EP | 96308763.0 | 6/1997 |

OTHER PUBLICATIONS

PCT International Search Report (counterpart of Parent U.S. Application No. 08/901,539).
Schill, Distributed System and Execution Model for Office Environments, Computer Communications, 10/91.
Trammell, Work Flow Without Fear, Byte, 4/96.

*Primary Examiner*—Zarni Maung
(74) *Attorney, Agent, or Firm*—Robert Moll

(57) ABSTRACT

The invention relates to a form route manager in a computer network. In one embodiment, the form route manager includes a sequenced list of e-mail addresses, means for determining if an e-mail received in the e-mail system originates from the last e-mail address in the sequenced list, and if so, deleting the e-mail, and if not, sending the e-mail to the next e-mail address in the sequenced list. In another, the form route manager includes a sequenced list of e-mail addresses, means for receiving a web page, including the document and a step indicator, means for determining from the step indicator and the route, whether it is the first step, the next step, and the next e-mail address, means for updating the step indicator to the next step, the e-mail address(to the next e-mail address, and if it is the first step, assigning a second URL to the document and means for sending the e-mail with the second URL, the updated step indicator and the document to the next e-mail address. In still another, the form route manager includes a sequenced list of IP addresses, means for sending the document as a web page to a first IP address in the sequenced list, means for receiving the web page, including the document and a step indicator, after the document is processed at the first IP address in the sequenced list, means for determining from the route and the step indicator, whether it is the first step, the next step, and the next IP address in the sequenced list, and if it is the first step, assigning a URL to the document, means for updating the step indicator to the second step and the IP address to a second IP address in the sequenced list, means for sending the web page with the updated step indicator and the document to the second IP address in the sequenced list, and means for receiving the web page, including the document and the updated indicator, after the document is processed at the second IP address in the sequenced list.

13 Claims, 27 Drawing Sheets

U.S. PATENT DOCUMENTS

| | | | |
|---|---|---|---|
| 5,329,626 A | 7/1994 | Klein et al. | |
| 5,436,730 A | 7/1995 | Hube | 358/401 |
| 5,457,797 A | 10/1995 | Butterworth et al. | |
| 5,466,159 A | 11/1995 | Clark et al. | 434/322 |
| 5,469,353 A | 11/1995 | Pinsky et al. | 382/131 |
| 5,490,097 A | 2/1996 | Swenson et al. | |
| 5,499,364 A | 3/1996 | Klein et al. | |
| 5,513,101 A | 4/1996 | Pinsky et al. | 705/3 |
| 5,535,322 A | 7/1996 | Hecht | |
| 5,548,506 A | 8/1996 | Srinivasan | 705/8 |
| 5,557,515 A | 9/1996 | Abbruzzese et al. | 705/9 |
| 5,586,252 A | 12/1996 | Barnard et al. | 714/48 |
| 5,623,600 A | 4/1997 | Ji et al. | |
| 5,627,764 A | 5/1997 | Schutzman et al. | |
| 5,632,018 A | 5/1997 | Otorii | |
| 5,655,084 A | 8/1997 | Pinsky et al. | 705/3 |
| 5,666,481 A | 9/1997 | Lundy | 714/4 |
| 5,666,492 A | 9/1997 | Rhodes et al. | 705/3 |
| 5,675,745 A | 10/1997 | Oku et al. | 705/7 |
| 5,706,452 A | 1/1998 | Ivanov | 345/331 |
| 5,710,921 A | 1/1998 | Hirose | 709/106 |
| 5,716,213 A | 2/1998 | Clark et al. | 434/322 |
| 5,726,920 A | 3/1998 | Chen et al. | 364/579 |
| 5,732,200 A | 3/1998 | Becker et al. | 395/114 |
| 5,734,837 A | 3/1998 | Flores et al. | 705/7 |
| 5,735,694 A | 4/1998 | Clark et al. | 434/322 |
| 5,745,687 A | 4/1998 | Randell | 709/201 |
| 5,745,901 A | 4/1998 | Etner et al. | 707/103 |
| 5,751,960 A | 5/1998 | Matsunaga | |
| 5,754,857 A | 5/1998 | Gadol | 395/680 |
| 5,761,404 A | 6/1998 | Murakami et al. | 714/15 |
| 5,765,033 A | 6/1998 | Miloslavsky | |
| 5,765,038 A | 6/1998 | Flannery et al. | 707/10 |
| 5,767,847 A | 6/1998 | Mori et al. | 345/329 |
| 5,768,506 A | 6/1998 | Randell | 709/202 |
| 5,774,656 A | 6/1998 | Hattori et al. | 709/223 |
| 5,774,661 A | 6/1998 | Chatterjee et al. | 709/203 |
| 5,781,857 A | 7/1998 | Hwang et al. | |
| 5,781,901 A | 7/1998 | Kuzma | |
| 5,787,175 A | 7/1998 | Carter | 380/25 |
| 5,790,789 A | 8/1998 | Suarez | 709/202 |
| 5,790,790 A | 8/1998 | Smith et al. | |
| 5,790,847 A | 8/1998 | Fisk et al. | 707/4 |
| 5,794,039 A | 8/1998 | Guck | |
| 5,799,297 A | 8/1998 | Goodridge et al. | 707/1 |
| 5,802,253 A | 9/1998 | Gross et al. | 706/47 |
| 5,802,493 A | 9/1998 | Sheflott et al. | 705/1 |
| 5,805,810 A | 9/1998 | Maxwell | |
| 5,822,526 A | 10/1998 | Waskiewicz | |
| 5,826,020 A | 10/1998 | Randell | 709/202 |
| 5,826,239 A | 10/1998 | Du et al. | 705/8 |
| 5,826,269 A | 10/1998 | Hussey | |
| 5,832,455 A | 11/1998 | Hayashi et al. | 705/7 |
| 5,838,923 A | 11/1998 | Lee et al. | |
| 5,845,255 A | 12/1998 | Mayaud | 705/3 |
| 5,848,248 A | 12/1998 | Kawasaki et al. | 709/238 |
| 5,848,271 A | 12/1998 | Caruso et al. | 709/300 |
| 5,848,393 A | 12/1998 | Goodridge et al. | 705/8 |
| 5,850,519 A | 12/1998 | Vazana | |
| 5,856,978 A | 1/1999 | Anthias et al. | 370/429 |
| 5,862,322 A | 1/1999 | Anglin et al. | 395/185.1 |
| 5,867,824 A | 2/1999 | Saito et al. | 705/9 |
| 5,870,545 A | 2/1999 | Davis et al. | 709/201 |
| 5,870,717 A | 2/1999 | Wiecha et al. | 705/26 |
| 5,870,719 A | 2/1999 | Maritzen et al. | 705/26 |
| 5,874,954 A | 2/1999 | Kilmer et al. | 345/333 |
| 5,878,398 A | 3/1999 | Tokuda et al. | 705/8 |
| 5,878,403 A | 3/1999 | DeFrancesco et al. | 705/38 |
| 5,890,149 A | 3/1999 | Schmonsees | 707/3 |
| 5,892,900 A | 4/1999 | Ginter et al. | 395/186 |
| 5,892,905 A | 4/1999 | Brandt et al. | 713/201 |
| 5,903,877 A | 5/1999 | Berkowitz et al. | 705/26 |
| 5,907,705 A | 5/1999 | Carter | 395/701 |
| 5,910,987 A | 6/1999 | Ginter et al. | 380/24 |
| 5,915,019 A | 6/1999 | Ginter et al. | 380/4 |
| 5,917,912 A | 6/1999 | Ginter et al. | 380/24 |
| 5,920,725 A | 7/1999 | Ma et al. | 395/712 |
| 5,920,861 A | 7/1999 | Hall et al. | 707/9 |
| 5,930,512 A | 7/1999 | Boden et al. | 395/710 |
| 5,930,801 A | 7/1999 | Falkenhainer et al. | 707/103 |
| 5,940,829 A | 8/1999 | Tsuiki et al. | 707/10 |
| 5,943,422 A | 8/1999 | Van Wie et al. | 380/9 |
| 5,949,876 A | 9/1999 | Ginter et al. | 380/4 |
| 5,950,169 A | 9/1999 | Borghesi et al. | 705/4 |
| 5,956,693 A | 9/1999 | Geerling | 705/14 |
| 5,960,200 A | 9/1999 | Eager et al. | 395/705 |
| 5,960,404 A | 9/1999 | Chaar et al. | 705/8 |
| 5,970,475 A | 10/1999 | Barnes et al. | 705/27 |
| 5,978,804 A | 11/1999 | Dietzman | 707/10 |
| 5,978,836 A * | 11/1999 | Ouchi | 709/206 |
| 5,982,891 A | 11/1999 | Ginter et al. | 380/4 |
| 5,986,568 A | 11/1999 | Suzuki et al. | 340/825.52 |
| 5,987,422 A | 11/1999 | Buzsaki | 705/9 |
| 5,991,733 A | 11/1999 | Aleia et al. | 705/8 |
| 5,999,911 A | 12/1999 | Berg et al. | 705/9 |
| 6,004,276 A | 12/1999 | Wright et al. | 600/508 |
| 6,006,195 A | 12/1999 | Marchak et al. | 705/9 |
| 6,006,215 A | 12/1999 | Retallick | 707/2 |
| 6,170,002 B1 * | 1/2001 | Ouchi | 709/206 |
| 6,279,042 B1 * | 8/2001 | Ouchi | 709/240 |

\* cited by examiner

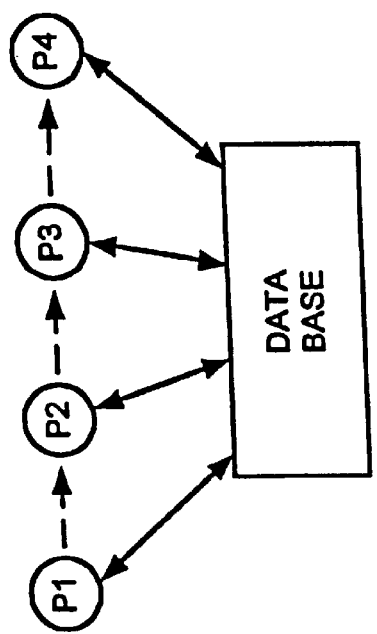
FIGURE 1a
DATA BASE WORKFLOW
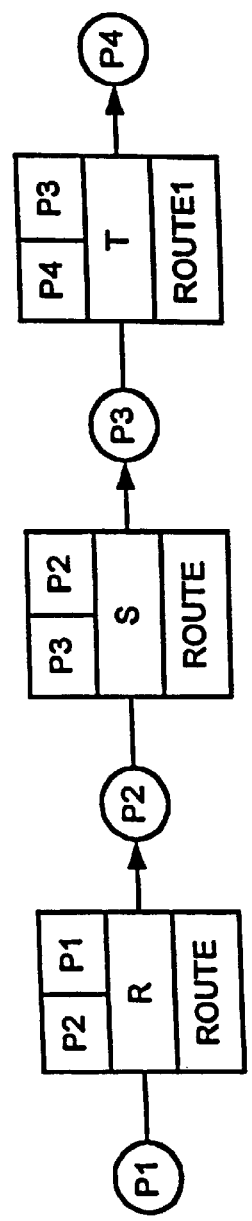
FIGURE 1b
ELECTRONIC MAIL WORKFLOW
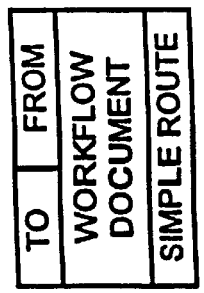
E-MAIL MESSAGE

WORKFLOW SYSTEMS AND METHODS

This application is a divisional of U.S. application Ser. No. 08/901,539, filed on Jul. 28, 1997, now U.S. Pat. No. 5,978,836, which is hereby incorporated by reference.

BACKGROUND OF THE INVENTION

The present invention relates to the field of computer networks, and in particular to workflow systems and methods used in computer networks to control, access, process, track, and modify documents.

A workflow system automates processing of documents in computer networks by defining the sequence of users with access to documents transmitted in the computer network. One application suitable for workflow is business travel reimbursement, having the following steps: (1) the traveler sends a request for reimbursement to a manager, (2) the manager reviews it; and (3) the manager either sends the approved request to accounting for payment or returns the request to the traveler for clarification. During the process, the users of the workflow system may want certain information. The manager may want information from the traveler before approval, accounting may want the total number of requests submitted by the traveler within the year, and the traveler may want to know where the request is in the process, especially if it is delayed.

A route describes the step-by-step sequence of a given, workflow. The route may have a linear sequence and/or complex conditional branching. The latter type may require databases to store the independent parallel routes which later join to form a linear route. Simple workflow may require only an e-mail system to emulate paper-based procedures using mail and routing slips. As shown in FIG. 1a, a database workflow system stores the document, the route, and the sequence of access in data tables. Because the information is stored in the memory of the database system, database systems can provide for complex routes, supply information on the document, and alert users to process delays. Many date also have failure detection and recovery mechanisms to assure reliability. However, databases require that users employ specific programs to process the workflow, and remain connected to the database for the entire session, which can result in expensive long distance phone calls when users are remote from the database. Because the users may participate in many workflow processes, database workflow systems may require a number of specific programs to be loaded in their PCs and require access to a number of databases This may unnecessarily confuse users who must then identify the programs and the databases associated with a given workflow.

As shown in FIG. 1b, an e-mail workflow system transmits the document and the route in the e-mail. This has the advantage that users only need e-mail programs such as Lotus cc:Mail or Microsoft Exchange. Further, a remote user such as a traveling manager can approve documents as remote e-mail. However, since key information about the document is in the e-mail, the workflow process fails if the e-mail is lost. Because there is no central memory, even basic information such as location of a document may be lost. In addition, since there is no access to global information, the e-mail workflow routes are limited to simple linear routes. Further, because the route is part of the e-mail and coded for a particular system, each PC must have a specific program to send the e-mail to the next user. So while users may have the advantage of easy access in e-mail workflow systems, they must have specific programs loaded in their PC before participating in the workflow process. This makes ad hoc creation of a workflow route impracticable, because the participants must have prepared in advance by loading all of the appropriate software in their PCs. As with the database workflow system in which many users participate in the workflow, an e-mail workflow requires many workflow programs be loaded in each PC, lacks capability to perform complex routes and track documents. Thus, the overall benefit of using current e-mail workflow systems is limited.

It would be desirable if workflow systems existed which could perform complex database functions, provide the easy accessibility of e-mail, avoid the need for specific programs in each PC, and insulate the user from the need to identify the pertinent server for a given workflow process.

SUMMARY OF THE INVENTION

The present invention relates to message-based workflow Systems and methods. In one embodiment, the present invention provides three elements: (1) an e-mail system; (2) PC's, terminals, or workstations connected by the e-mail system; and (3) a form route manager connected by the e-mail system.

In one embodiment, the present invention provides an e-mail-based workflow system for processing a document, where the system is connected to a computer network and an e-mail system, comprising:

(1) a form route manager, connected to the computer network, capable of receiving and sending the e-mail, and capable of defining, (2) a route, a step-by-step sequence of e-mail addresses, in the network; and wherein a computer with an e-mail address in the network is adapted to send the e-mail to the form route manager which is adapted to send the e-mail to the next e-mail address in the route.

In another embodiment, the present invention provides a method for centrally distributing an e-mail to a step-by-step sequence of e-mail addresses, comprising:

(1) receiving the e-mail with an indicator of the step in the sequence;

(2) determining from the indicator and the sequence, the successor e-mail address in the sequence;

(3) updating the e-mail indicator to the successor step; and (4) sending the e-mail to the successor e-mail address.

BRIEF DESCRIPTION OF THE DRAWINGS

FIG. 1a illustrates the architecture of a conventional database workflow system.

FIG. 1b illustrates the architecture of a conventional e-mail workflow system.

DESCRIPTION OF PREFERRED EMBODIMENTS

Figure 2:
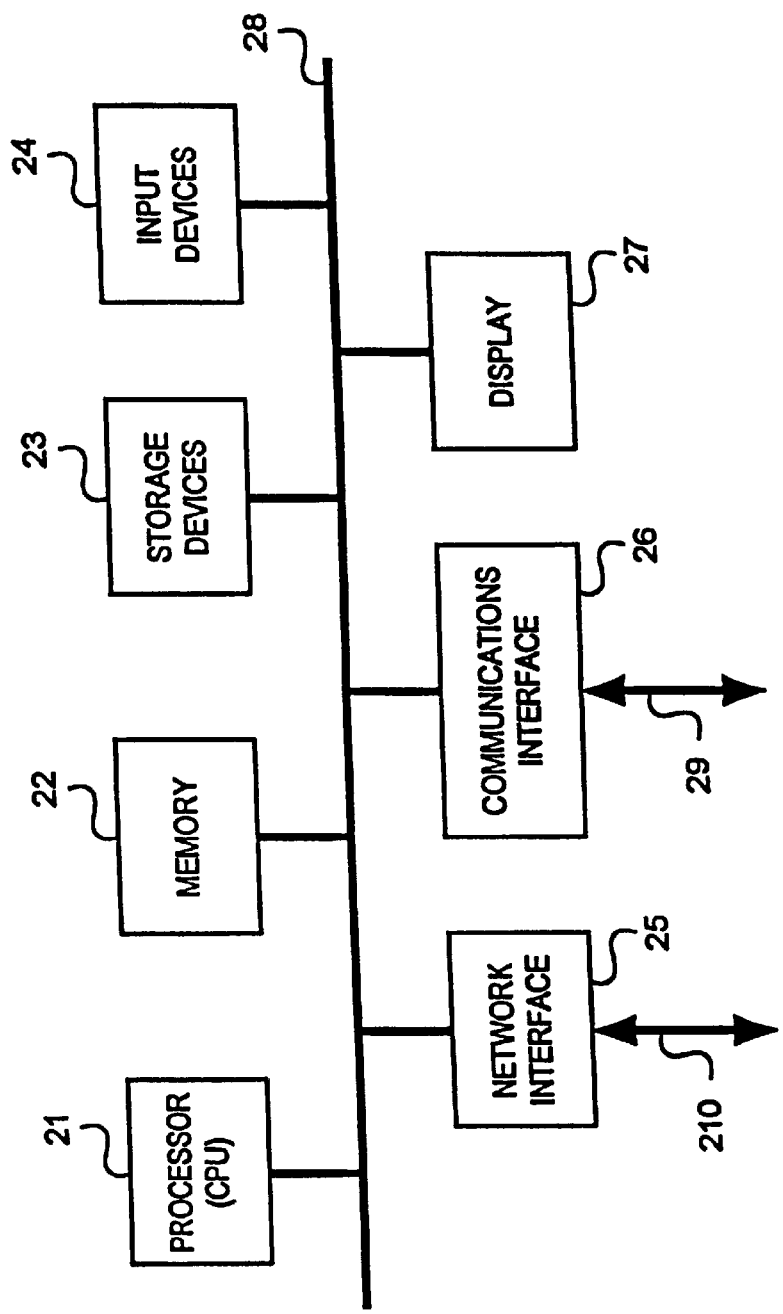
FIG. 2 illustrates one embodiment of the hardware of the form route manager.

The systems and methods for message-based workflow preferably operates in a computer network. The form route manager is embodied in a computer in the network. With reference to FIG. 2, one embodiment of the form route manager is comprised of a processor (CPU) 21, a memory 22, storage devices 23, input devices 24, network interface 25, communications interface 26, and display 27. These elements are interconnected by a bus 28 as typically implemented in an IBM compatible PC. The CPU 21 is preferably an Intel Pentium, AMD K6, Power PC, Motorola 68000, or the like. The display 27 is preferably a video monitor and the input device 24 is a keyboard and mouse. The storage devices 23 are a hard disk drive, a floppy diskette drive and a CD ROM drive. Those skilled in the art would realize the form route manager may be a workstation, mini-computer, or mainframe computer and that they may be used by multiple users with multiple sets of display and input devices.

The network interface 25 connected to bus 28 is connected to a local area network (LAN) or wide area network (WAN) 210 to communicate to other computers in the network. The network interface 25 is preferably an Ethernet or Token ring adapter connected to a twisted pair wire or to a coaxial cable. The communications interface 26 is connected 29 to a communications network which communicates with other computers using the dial up phone system as a network. The communications interface 26 is preferably a modem. The CPU 21 operates under the control of instructions stored in memory 22.

Figure 3:
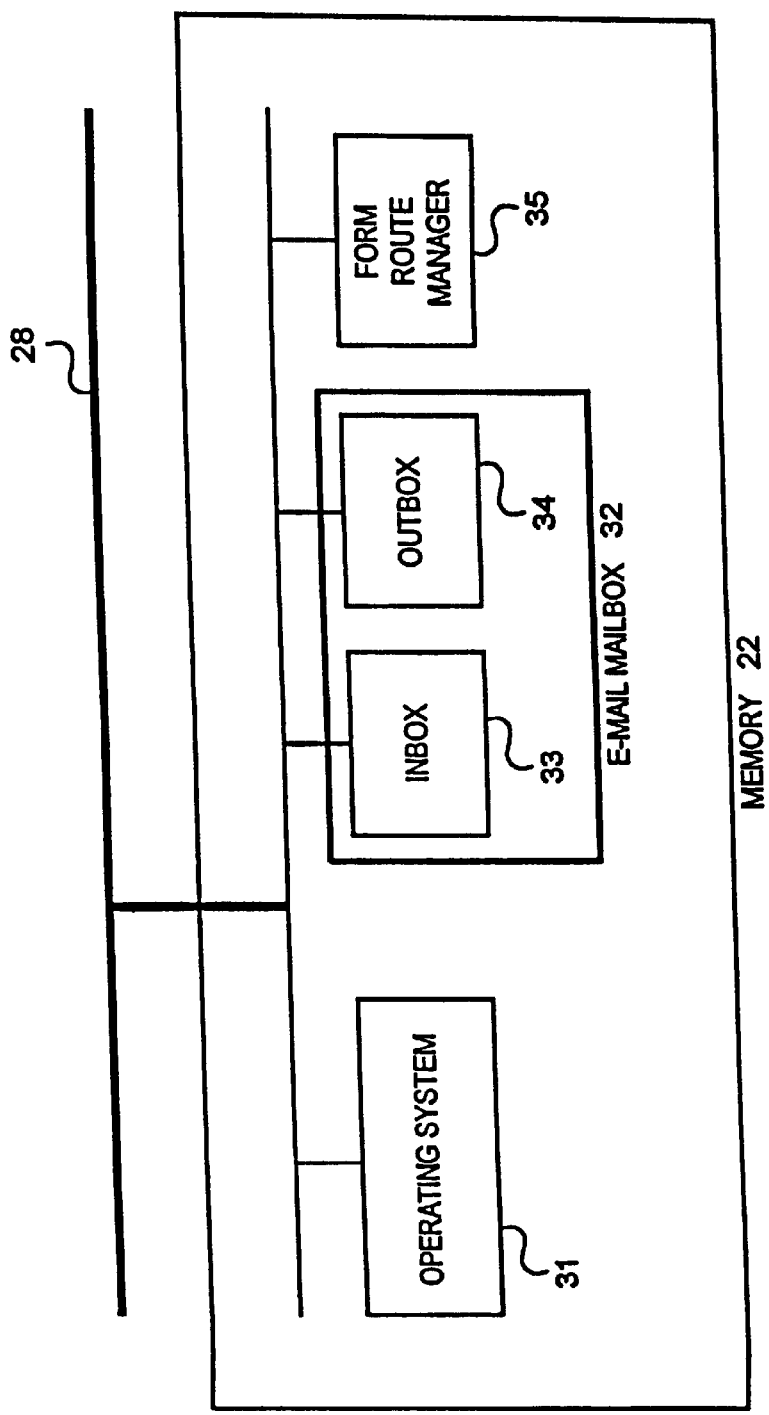
FIG. 3 illustrates one embodiment of the software stored in the memory of the form route manager.

FIG. 3 illustrates a more detailed preferred embodiment of memory 22. The memory 22 is preferably random access memory (RAM) but may include read only memory (ROM). The memory 22 includes operating system 31, e-mail mailbox 32 with an in-box 33 and an out-box 34, and the form route manager 35. The operating system is preferably Microsoft Windows NT or Windows 95. The e-mail mailbox 32 is preferably Microsoft Exchange or Lotus cc:Mail. Each e-mail mailbox 32 has an e-mail address that is a unique identifier within the e-mail system. Each e-mail message contains a field with the e-mail address of the e-mail mailbox 32 to which the e-mail is sent, a field with the e-mail address of the e-mail mailbox 32 from which it was sent, and a field with the content of the message. A user of an e-mail mailbox 32 receives e-mail in the in-box 33 and can select, open and read the e-mail. New e-mail is created using a text editor, addressed with the e-mail address of the mailbox to which it is to be sent, and is sent by placing the e-mail in the out-box 34. The e-mail on the LAN and WAN is transmitted to the in-box 33 and from the out-box 34 through the network interface 25 and through the communications interface 26 for e-mail transmitted remotely using the dial up phone lines. E-mail is generally discussed on pages 643–669 in section 7.4 of Tanenbaum, *Computer Networks* (1996), Prentice-Hall, which is hereby incorporated by reference.

Figure 4:
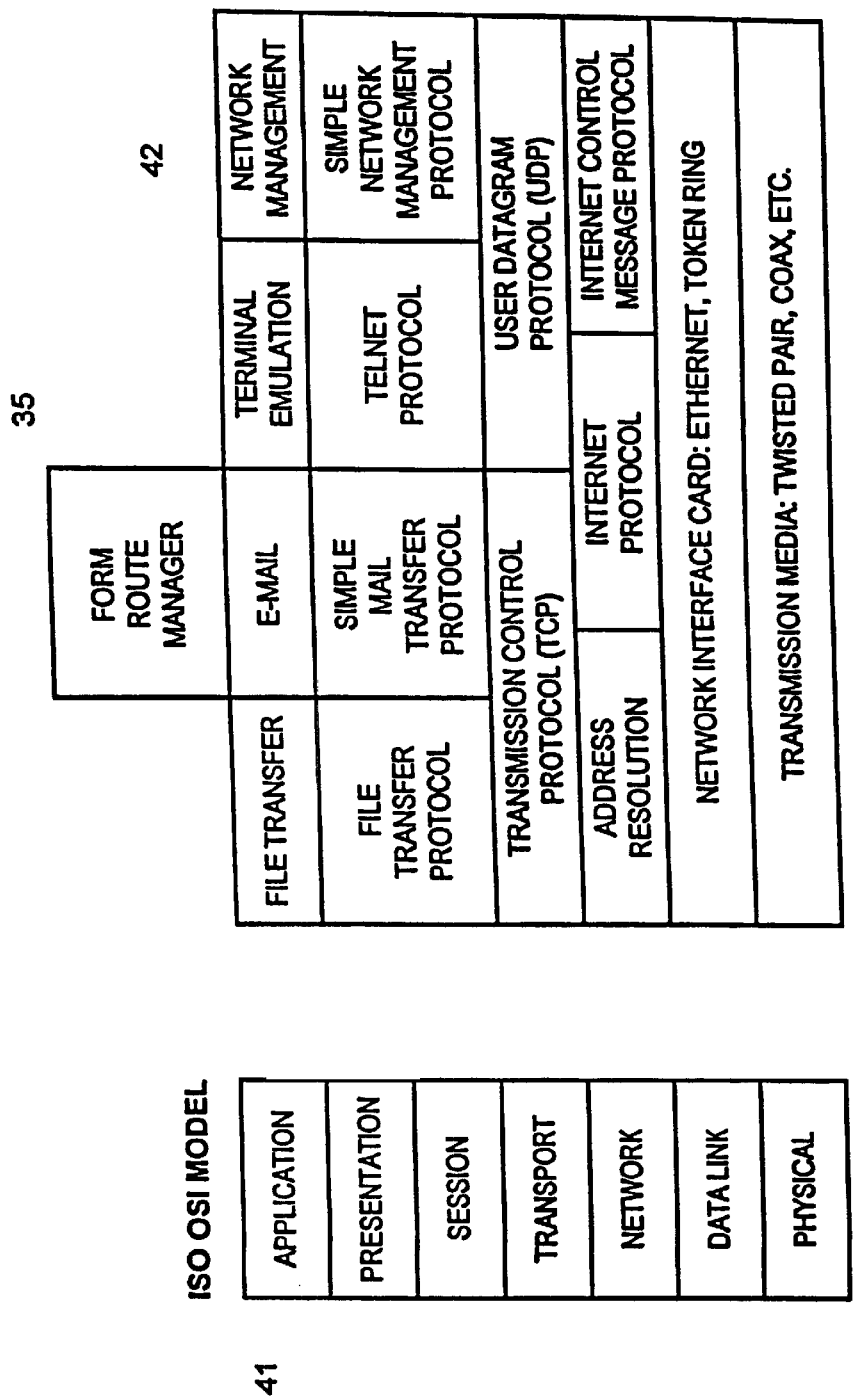
FIG. 4 is the ISO OSI network layer model, and the relationship of the model to the form route manager.

The form route manager 35 uses the e-mail as an application. FIG. 4 illustrates the form route manager 35 in relationship to the ISO OSI reference model 41 and the implementation layers 42 of the ISO OSI reference model. Those skilled in the art will recognize that the form route manager may be adapted to utilize a wide set of messaging and e-mail systems such as IBM PROFS, DEC Mail, Inteqnet Mail, Oracle Mail, Lotus cc:Mail, Microsoft Exchange, SMTP mail, wireless mail, LAN- and WAN-based, remote mail and mail access using phone lines, Internet access, wireless access, voice mail, video mail, and other forms of messaging with characteristics of addressable messages. Since the Internet functions to connect numerous e-mail systems, all e-mail systems connected to the Internet, even those connected through intermediate mail systems and relay nodes, can be considered to be part of one e-mail system.

Figure 5:
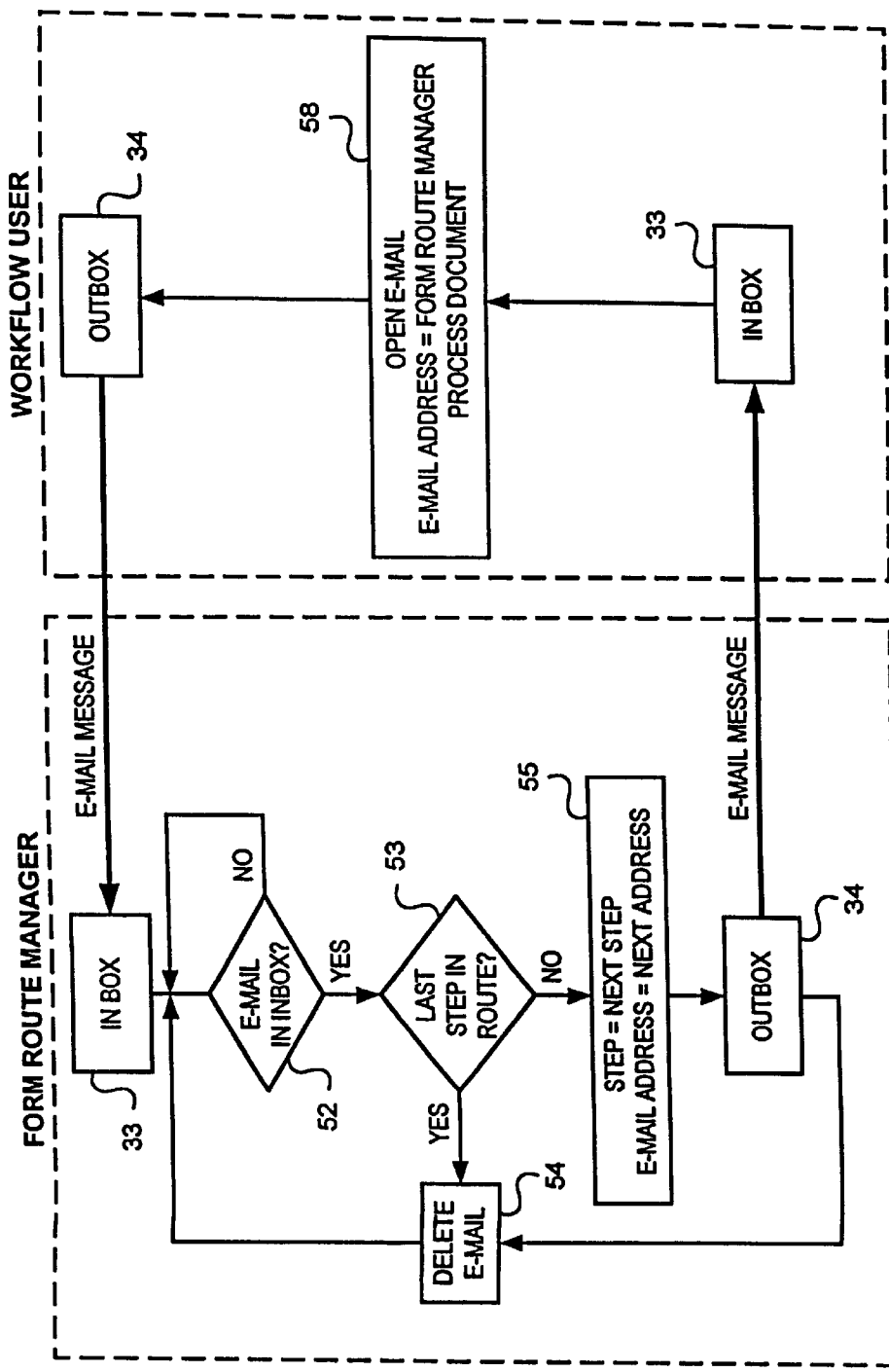
FIG. 5 is a flowchart of the form route manager functions and the workflow user functions.

The function of the form route manager 35 is illustrated in the flowchart in FIG. 5. The route is a step-by-step sequence of e-mail addresses. The mailbox for the form route manager is assigned an e-mail address. The e-mails addressed to the form route manager are received in the in-box 33. At step 52, the form route manager checks if the e-mail is in the in-box 33. If there is an e-mail, it checks at step 53 if the e-mail is sent from an e-mail address that is the last step in the route. If it is the last step in the route, the e-mail is deleted at step 54 from the in-box. If it is not the last step, at step 55, a step field is set to the next step in the route and the e-mail address is set to the e-mail address of the next step in the route. The e-mail is sent to the next e-mail address by using out-box 34. The e-mail is deleted at step 54 from the in-box. In other words, the form route manager receives an e-mail from an e-mail address in the route and sends it to the next e-mail address in the route. If the e-mail is from the e-mail address that is the last step in the route, the e-mail is not sent further.

The form route manager function is part of a message-based workflow system. This is illustrated in FIG. 5, where the e-mail contains a workflow document and the route specifies the step-by-step sequence of e-mail addresses of the workflow. The message-based workflow user receives the workflow document as e-mail in the in-box 33. The user selects 58 the e-mail from the in-box 33, opens the e-mail, sets the e-mail address to that of the form route manager, processes the workflow document in the e-mail, and sends the e-mail back to the form route manager using the out-box 34. The form route manager receives the e-mail in the in-box, and if this is not the last step in the route, sends the e-mail to the next e-mail address as described earlier. This process continues until the workflow route is completed.

Many e-mail systems have a reply function which returns an e-mail to the sender, which can be used to return e-mail to the form route manager without explicitly entering the e-mail address of the form route manager. A more complex environment may have multiple form route managers, each with an e-mail address. In a preferred embodiment, users need not be concerned as to which form route manager sent the e-mail, because the reply function will return e-mail to the correct form route manager. The users need only open the e-mail from the in-box, process the workflow document in the e-mail, use the reply function to address the e-mail to the correct form route manager, and send it out the out-box.

The form route manager provides a central, sequential e-mail distribution function based on the step-by-step sequence of a route where a computer in the network sends an e-mail to the form route manager and the form route manager sends the e-mail to the next computer in the route.

Figure 6:
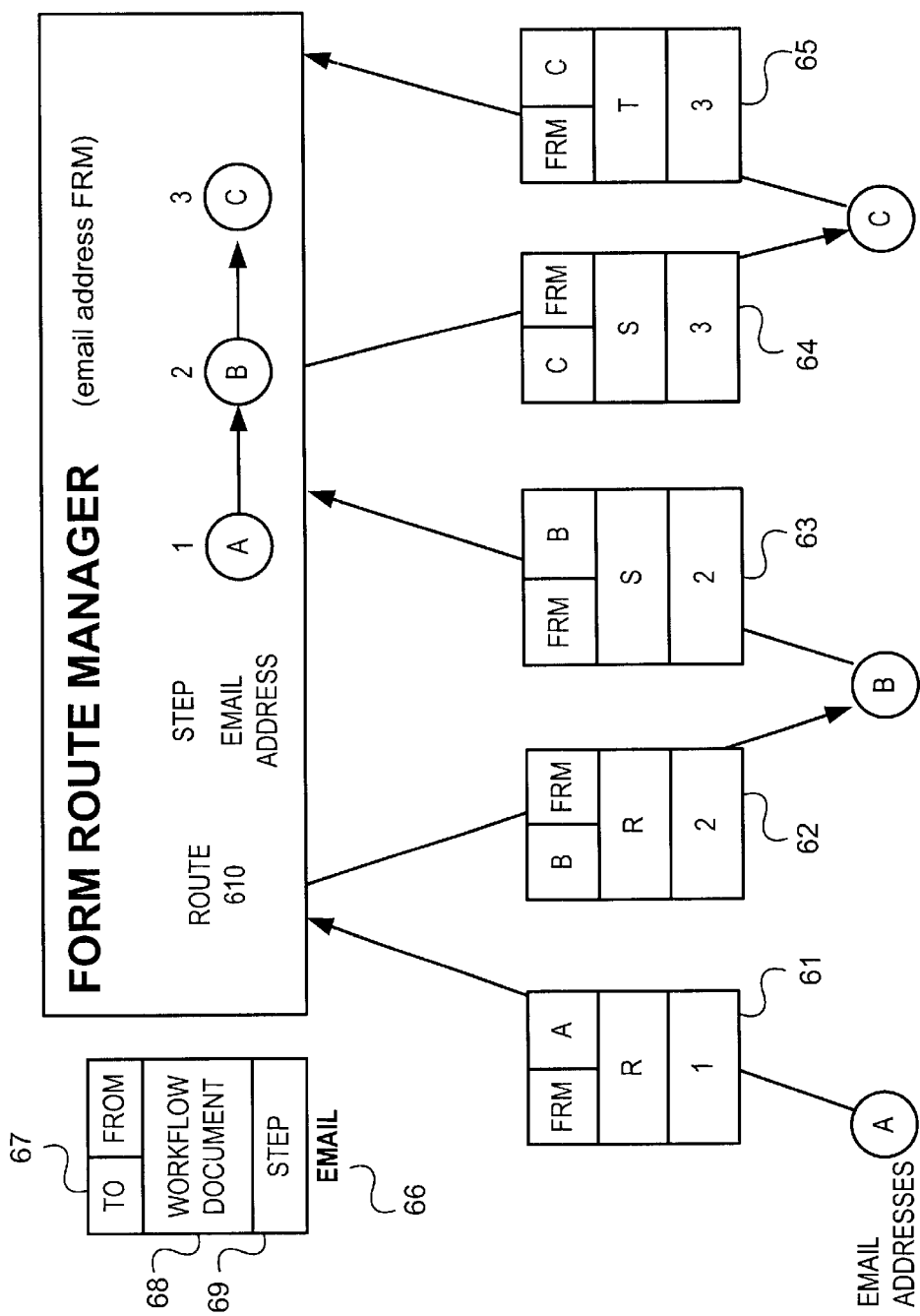
FIG. 6 is a block diagram of the system and the sequence of e-mails demonstrating one function of the present invention.

In an embodiment, the route defines the sequence of e-mail addresses of the workflow. The route is contained in a table of structured query language (SQL) in an SQL database accessed by the form route manager. As shown in FIG. 6, the route 610 includes an e-mail address A, an e-mail address B, and an e-mail address C implemented by the SQL table ROUTE where each row of the table represents a step in the route: STEP, the next e-mail address: NEXT E-MAIL ADDRESS, and the next step in the route: NEXT STEP.

| SQL TABLE ROUTE: | | |
|---|---|---|
| STEP | NEXT E-MAIL ADDRESS | NEXT STEP |
| 1 | B | 2 |
| 2 | C | 3 |
| 3 | NULL | NULL |

The first row indicates that for step=1, the next e-mail address is B and the next step is 2. For the second row step=2, and the next e-mail is C and next step is 3. The third row for step=3, the next e-mail address and next step values are NULL which indicates step 3 is the last step in the route.

The e-mail and the form route manager contain the information necessary to identify the step in the route. As shown in FIG. 6, in one implementation, the e-mail contains a control field, STEP 69, that holds the value of step to access the route SQL table to determine the next e-mail address and next step. Those skilled in the art will realize there are many data structures that can be used to implement the information needed in the route and that the route step information can be indicated by other means such as a storage location in the form route manager.

FIG. 6 illustrates the workflow e-mail format, the route in the form route manager and the sequence of e-mails sent between the e-mail addresses and the form route manager to effect the workflow of route 610 for the sequence: A to B to C. The e-mail format 66 consists of the e-mail To and From address fields 67, the workflow document as the body of the message 68, and the control field, STEP 69.

In one embodiment, the workflow document is processed as follows:

1) The user at e-mail address A initiates the workflow by sending an e-mail 61 with document R and STEP=1 to the form route manager,
2) The form route manager receives the e-mail 61, and determines from STEP=1 and the route that the next e-mail address is B and the next step is 2. The form route manager updates STEP=2 and sends the workflow document R as e-mail 62 to e-mail address B;
3) The user at e-mail address B receives the e-mail 62 from the form route manager, processes the document by changing the body of the message to S, and sends e-mail 63 back to the form route manager;
4) The form route manager receives the e-mail 63, and determines from STEP=2 and the route that the next e-mail address is C and that the next step is 3. The form route manager updates STEP=3 and sends the workflow document as e-mail 64 to e-mail address C;
5) A user at e-mail address C receives the e-mail 64 from the form route manager, processes the document by changing the body to T, and sends e-mail 65 back to the form route manager, and
6) The form route manager receives the e-mail 65 and determines from STEP=3 and the route the next step is NULL which completes the route.

In this example, the workflow document is embodied in five different e-mails, but at any time only one is the active carrier of the document. If e-mail 61 is transformed into e-mail 62, the e-mail 61 no longer acts as the carrier of the document and can be deleted. Each e-mail carries its position in the route in the control field STEP 69. This permits more than one concurrent use of a workflow route. Because each workflow e-mail carries its state in the route, each document is independent of other workflow documents and may share the same route without interference. Using the e-mail address or name of a user as indicator of the step in a route is ambiguous, since the e-mail address or name may be repeated in a route. Thus, the e-mail field STEP 69 permits the route to distinguish each use of a user who may appear more than once in the route. As an example, a workflow that requires the user at e-mail address A to review the work of the user at e-mail address B, which is then followed by work by the user at e-mail address C, which is reviewed by the user at e-mail address A, the route might be described by the sequence: e-mail address B (STEP=1), e-mail address A (STEP=2), e-mail address C (STEP=3), e-mail address A (STEP=4). The use of only the e-mail address as the state variable would not distinguish between the first use of e-mail address A (STEP=2) from the second use of e-mail address A (STEP=4). This example demonstrates implementation of a workflow system where each user need only have access to the e-mail system.

A more sophisticated user interface for workflow can be developed by use of special electronic form programs that format the e-mail and display the workflow e-mail as a workflow form for editing and automate the reply function to address the e-mail to return to the form route manager. For example, the Microsoft operating systems and Microsoft Exchange e-mail system with the Microsoft E-Forms extensions have these functions as part of the Windows environment and the message-based workflow system can take advantage of this without other special programs.

Figure 7:
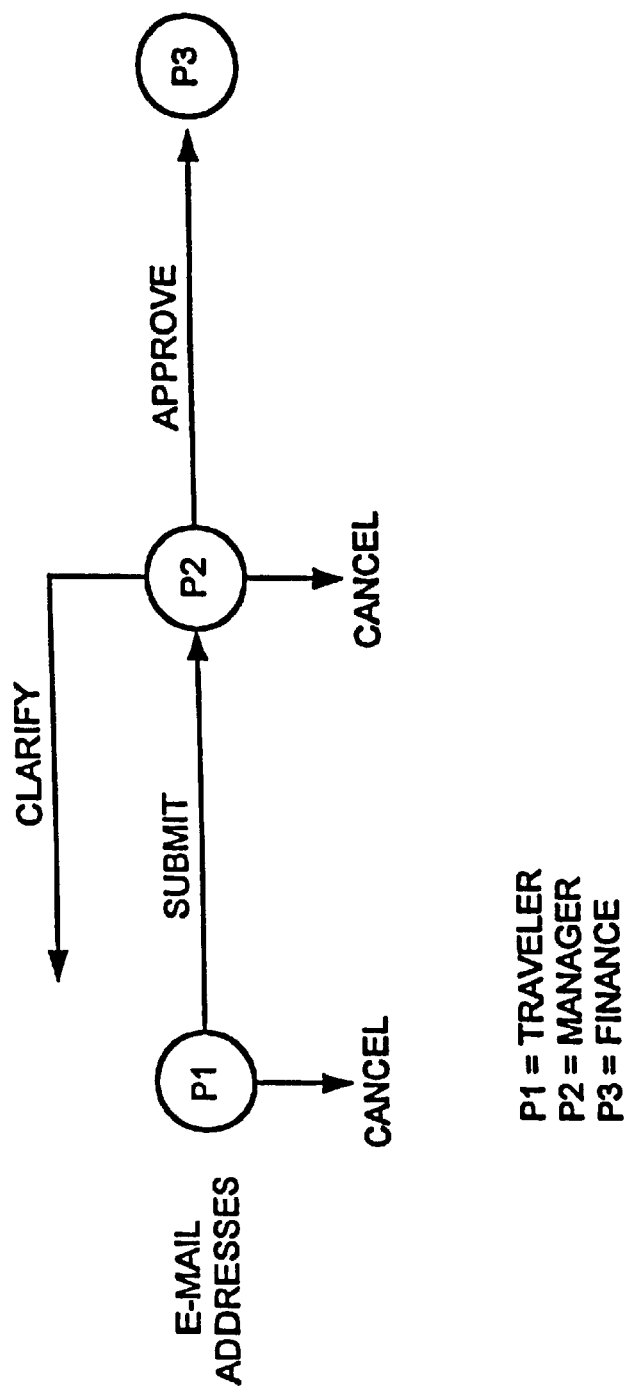
FIG. 7 is an example of business travel reimbursement approval.

FIG. 7 shows one embodiment of the invention in the context of reimbursement approval. Rather than a linear route, the workfilow required has several conditional branches. A traveler, P1, can SUBMIT the completed business travel reimbursement document to the manager or can elect to CANCEL the travel approval procedure after a CLARIFY return from the manager as described later. The manager, P2, may APPROVE, sending the document to finance, P3, or may ask to CLARIFY, sending it back to P1 (for example, to ask for explanations or corrections), or may CANCEL the approval procedure. Finance, P3, can send a message to P1 when the procedure is complete. The traveler, P1, may receive the document back from the manager, P2, and can amend it and SUBMIT it back to P2 or may CANCEL the procedure. The participants and others may want information about the status of the procedure.

The travel reimbursement workflow illustrates useful features of the form route manager. These features are: (1) support for two or more different routes; (2) capability to track each document in the workflow system and to collect statistical information; (3) support for conditional branches and cancellation of a document workflow; and (4) support for sending messages when specific steps are processed or when conditional events occur. These may be combined to implement a workflow system which supports business procedures like the business travel reimbursement procedure.

Support for Two or More Routes

Figure 8:
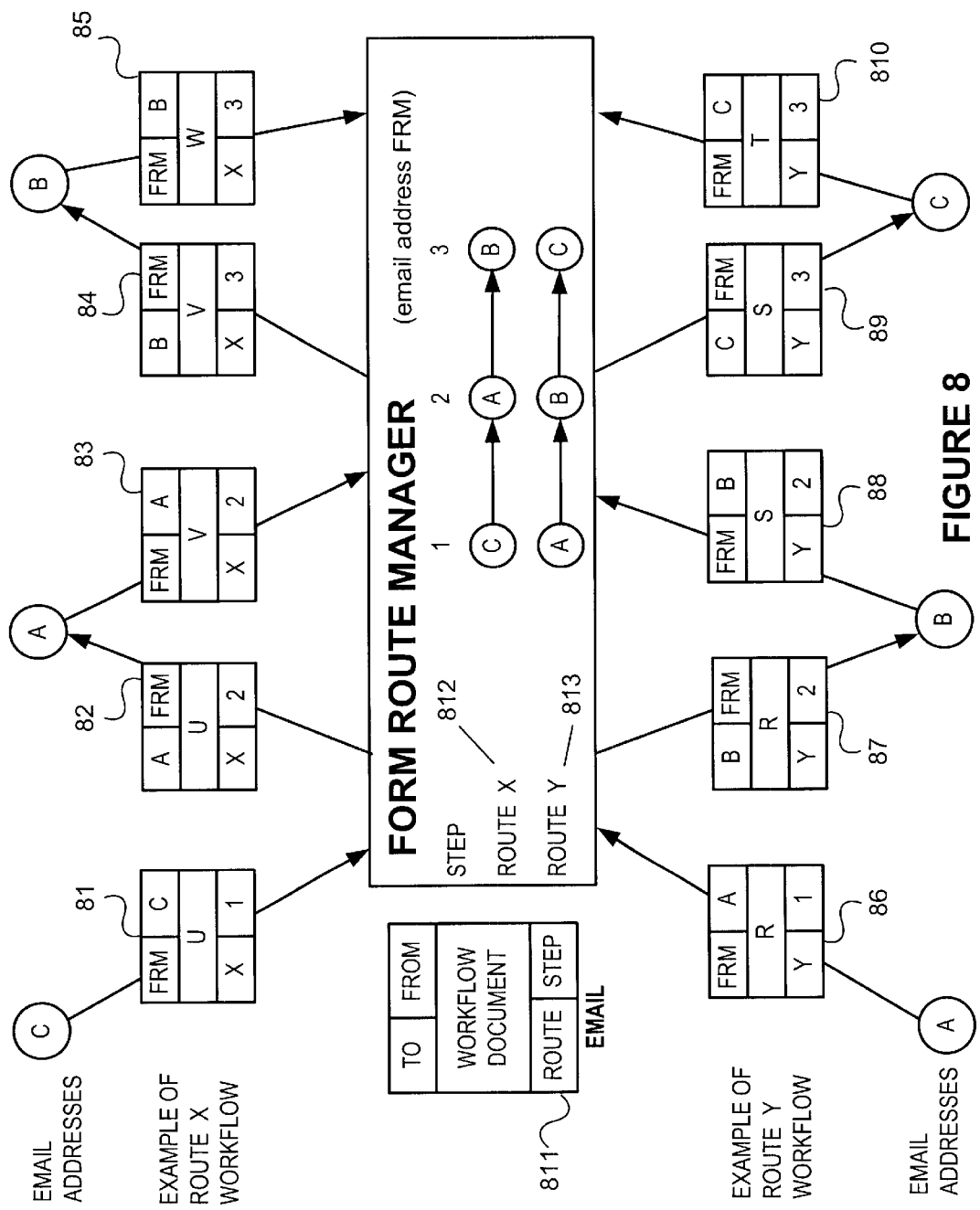
FIG. 8 is a block diagram and sequence of e-mails illustrating the function to support multiple routes.

The present invention of message-based workflow supports multiple routes as illustrated in FIG. 8 by the use of an e-mail control field ROUTE 811 that is set to the name of the route with which the e-mail is associated. The SQL Table ROUTE X & Y illustrate the SQL table structure to implement two routes named X 812 and Y 813.

| SQL TABLE: ROUTE X & Y: | | | |
|---|---|---|---|
| ROUTE | STEP | NEXT E-MAIL ADDRESS | NEXT STEP |
| X | 1 | A | 2 |
| X | 2 | B | 3 |
| X | 3 | NULL | NULL |
| Y | 1 | B | 2 |
| Y | 2 | C | 3 |
| Y | 3 | NULL | NULL |

Row one of SQL Table ROUTE X & Y indicates that for route X at step 1, the next e-mail address is A and the next step in route X is 2 and so forth. The form route manager determines the next e-mail address and next step by using the ROUTE and STEP control fields in the e-mail to access the route SQL table and updates the e-mail address to the next e-mail address and STEP to the next step and sends the e-mail to the next e-mail address.

FIG. 8 illustrates the form route manager supporting the two routes: route X 812 and route Y 813. The e-mail contains the control field ROUTE 811 to identify which route is to be used for the e-mail. The sequence of e-mails: 81, 82, 83, 84, and 85 with control field ROUTE=X is processed using Route X and the sequence of e-mails: 86, 87, 88, 89, and 810 with control field ROUTE=Y is processed using route Y.

Tracking Each Document and Provide Statistical Information

Figure 9:
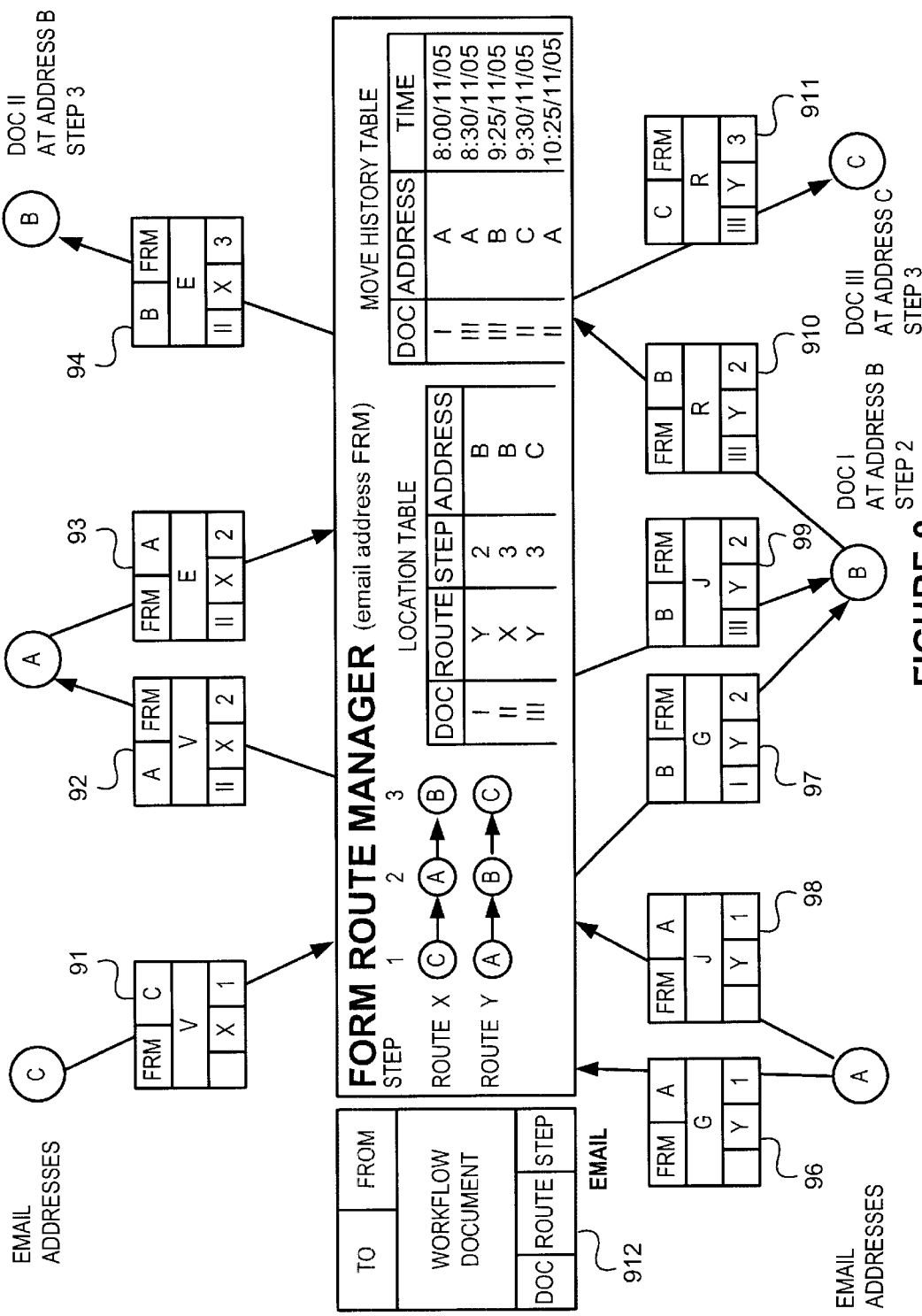
FIG. 9 is a block diagram and sequence of e-mails illustrating the tables and functions to track the location and move history of each workflow document.

Additional functions are provided when the form route manager tracks each document as it is processed. In FIG. 9, the e-mail control field DOC 912, for document, is a message control field associated with a workflow document and is carried in each workflow e-mail to identify the document that it is carrying. The value of DOC 912 for a given document must be unique to distinguish an e-mail containing this document from among the e-mails for other documents active in the workflow system. The value for DOC 912 is set when a document begins a procedure with the initial e-mail. The value may be set by the form route manager, or by the user and the form route manager will verify that the value is unique for the active document, or by rules that insure that the values are unique. An example of a rule to generate a unique DOC 912 value is the concatenation of the user e-mail address and the time in milliseconds and date. This value would be unique since it would be impossible for a user at the same e-mail address to create two documents at the same time in milliseconds.

As illustrated in FIG. 9, the form route manager contains a LOCATION table and a MOVE HISTORY table. These are referenced using DOC 912 as the index. An implementation could combine these two tables into one where the most recent entry for a document represents the location of the document in the workflow system.

FIG. 9 illustrates workflow for three documents where one workflow is initiated by a user at e-mail address C who generates the sequence of e-mails 91, 92, 93, and 94 that follow route X. The e-mail 91 does not have a DOC 912 value when sent by a user at e-mail address C to the form route manager, but rather merely identifies it is an initial e-mail, STEP=1, and which route is to be used, ROUTE=X.

The form route manager assigns II for DOC 912 for the e-mail and table indexes. The form route manager then enters in the MOVE HISTORY table that the e-mail assigned DOC=II was received from the e-mail address C at a military time and date of 9:30 November 5. The form route manager determines e-mail address A is the next address in ROUTE X and sends the e-mail 92 with DOC=II, ROUTE=X, and STEP=2, to e-mail address A and enters the following in the LOCATION table: DOC=II, ROUTE=X, STEP=2, e-mail address=A. The user at e-mail address A processes e-mail 92 (changes the body fom "V" to "E") and returns e-mail 93 to the form route manager. The form route manager using that ROUTE=X and STEP=2 determines that the next step in route X is 3, the next e-mail address B, and updates the step field to STEP=3 and the e-mail address field to e-mail address=B. As shown in FIG. 9, the form route manager uses DOC=II as an index to access the LOCATION table and update the LOCATION table to e-mail address B, and adds in the MOVE HISTORY table: DOC=II, e-mail address=A, Time=10:25 November 5, and sends the e-mail 94 to e-mail address B. The LOCATION table indicates that the workflow document is at e-mail addresss B and the MOVE HISTORY table indicates it was sent at 10:25 on November 5. From the MOVE HISTORY table, one can tell the workflow started at 9:30 on November 5 and that it took the user at e-mail address A about 55 minutes to respond and perform that workflow step.

The user at e-mail address A initiates two documents which generates e-mail sequence 96 and 97 with DOC=I and e-mail sequence 98, 99, 910, and 911 with DOC=III, both following route Y. The LOCATION table indicates that DOC=I is currently at e-mail address B and DOC=III is at e-mail address C. The MOVE HISTORY table provides the process timing and the users who processed these steps. The number of entries in the LOCATION table is a measure of the number of active documents in the workflow system. The MOVE HISTORY table can be used to calculate statistics, e.g., average time to use the Route X procedure, the total number of documents processed, and find any workflow step with large process time indicating a possible bottleneck.

The LOCATION table holds values for ROUTE and STEP for each active document. The e-mail field DOC 912 can be used as the index to access these values from the LOCATION table and remove the need for ROUTE and STEP in the e-mail except for the initial e-mail. However, having this information in both the e-mail and LOCATION table provides an integrity check on the flow of the document. For example, the form route manager can compare the ROUTE and STEP fields of an e-mail with the values in the LOCATON table to detect an old e-mail for a document an d prevent the propagation of an erroneous e-mail.

Conditional Branching and Conditional Canellation

Some workflow requires a change in the flow of the document based on decisions made in a workflow step. In the business travel reimbursement example, the manager could approve the docuument and send it to accounting, send the document back to the traveler, or cancel the approval procedure. The route can specify steps in which choices may be made or the specific functions to be executed by the form route manager. The SQL table branch route illustrates structure to support the conditional branching illustrated in FIG. 10.

| SQL TABLE BRANCH ROUTE: | | | |
|---|---|---|---|
| STEP | NEXT E-MAIL ADDRESS | NEXT STEP | BRANCH ROUTE |
| 1 | B | 2 | |
| 2 | C | 3 | Y |
| 2 | D | 4 | N |
| 3 | NULL | NULL | |
| 4 | NULL | NULL | |

In the BRANCH ROUTE table, row one indicates that at step 1, the next e-mail address is B and the next step is 2. However, rows two and three have the same step value of 2. This permits selection of the route based on the value of the BRANCH ROUTE.

Figure 10:
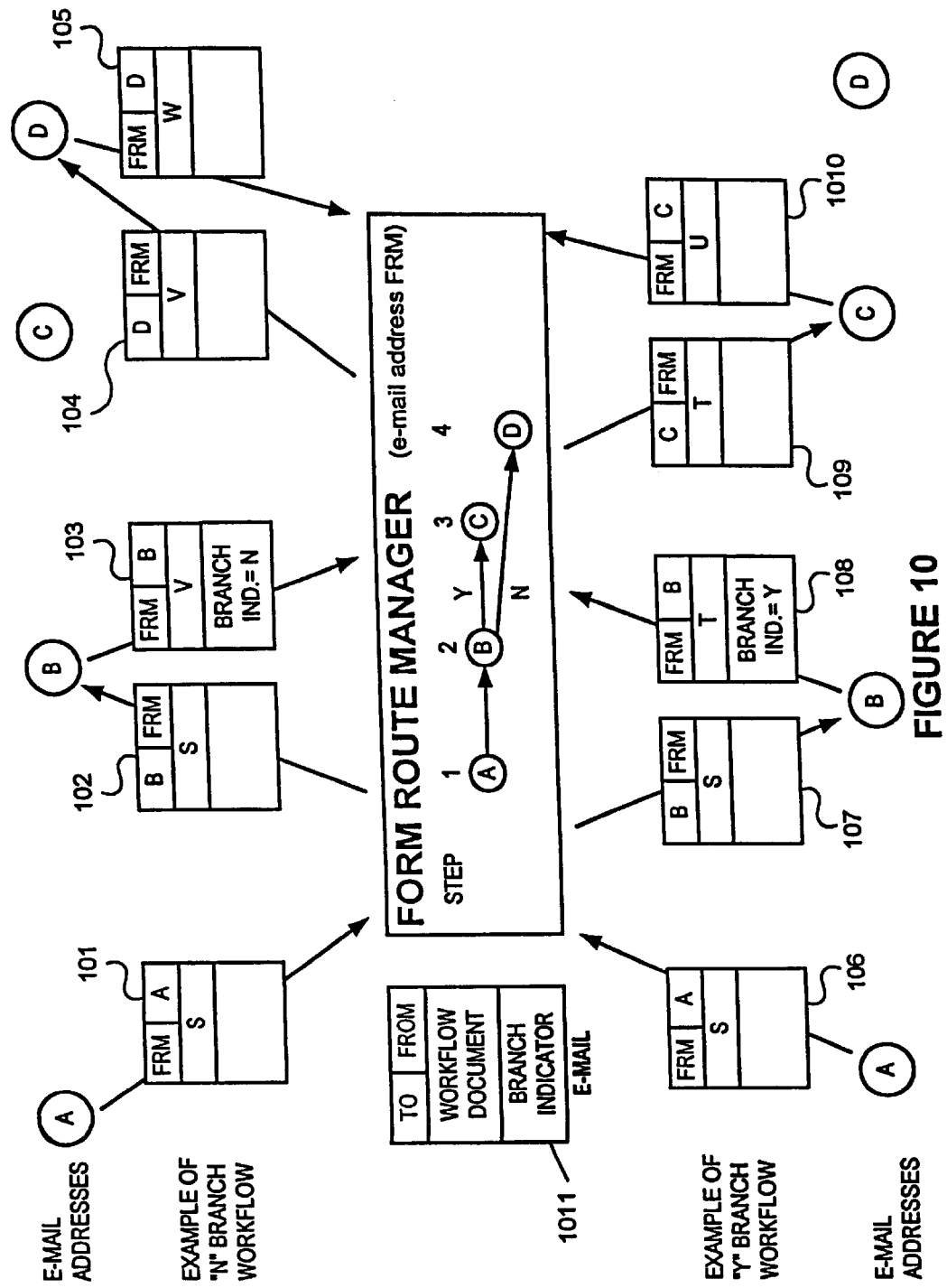
FIG. 10 is a block diagram and sequence of e-mails illustrating the CONDITIONAL BRANCH function.

In FIG. 10, the route permits a user at e-mail address B at Step 2 to select the route branch by setting the control field BRANCH INDICATOR. The user at e-mail address B can send the document to e-mail address C by setting the BRANCH INDICATOR=Y which selects the branch route to e-mail address C or can select e-mail address D by setting the BRANCH INDICATOR=N. The e-mail sequence 101 and 102 transmits the document from the user at e-mail address A to e-mail address B. The user at e-mail address B responds with e-mail 103 with BRANCH INDICATOR=N. The form route manager compares the BRANCH INDICATOR with the BRANCH ROUTE and determines that the next e-mail address in the selected branch route is e-mail address D and sends the e-mail 104 to the e-mail address D. A user at e-mail address D completes the route by sending the e-mail 105 to the form route manager. E-mail sequence 106, 107, 108, 109, and 1010 illustrates a document workflow that selects the branch route to the e-mail address C by setting the BRANCH INDICATOR=Y. While the example illustrates a two-way branching decision, three or more branches can be implemented easily after review of the present application.

Figure 11:
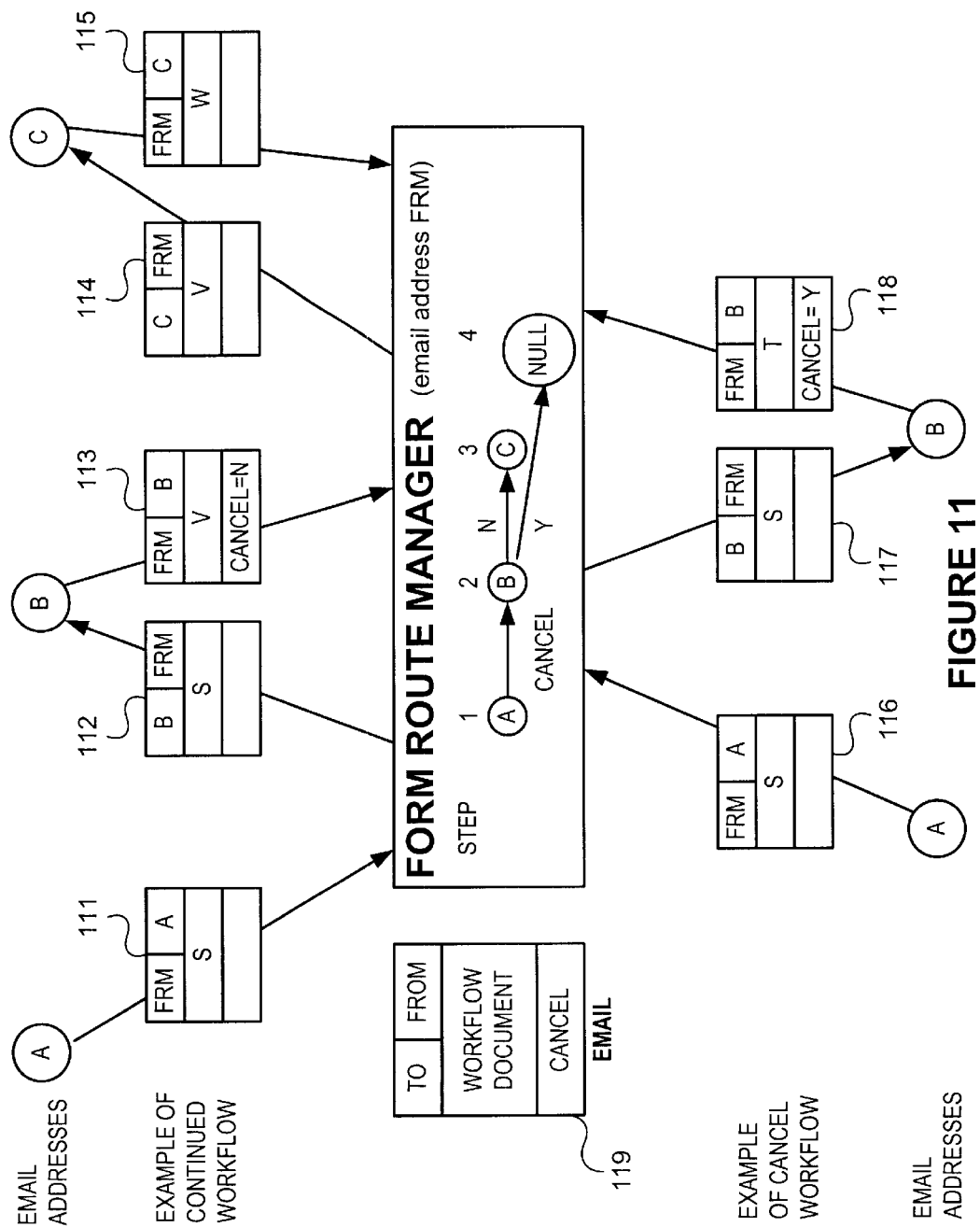
FIG. 11 is a block diagram and sequence of e-mails illustrating the CONDITIONAL CANCEL function.

The cancellation of workflow can be thought of as a special case of the conditional branch where the workflow terminates on one of the branches. In FIG. 11, the e-mail contains a control field CANCEL 119. A user at e-mail address B can either send the document to e-mail address C or cancel the work flow by setting CANCEL=Y. The e-mail sequence 116 and 117 sends the document from the user gt e-mail address A to e-mail address B. In e-mail 118, the user at e-mail address B cancels the work flow by setting the CANCEL=Y. The form route manager determines from CANCEL 119 being set=Y that no further e-mails are to be sent for this document. The e-mail sequence 111, 112, 113, 114, and 115 illustrate a workflow where the user at e-mail address B continues the work flow and the document is sent to e-mail address C.

Another form of a conditional cancel can be made by constructing a route that permits selecting a branch route that ends the work flow using the BRANCH INDICATOR as described earlier. The indicator for the end of a work flow in this example is a branch route with "NULL" as the next route step.

Event Notification

Figure 12:
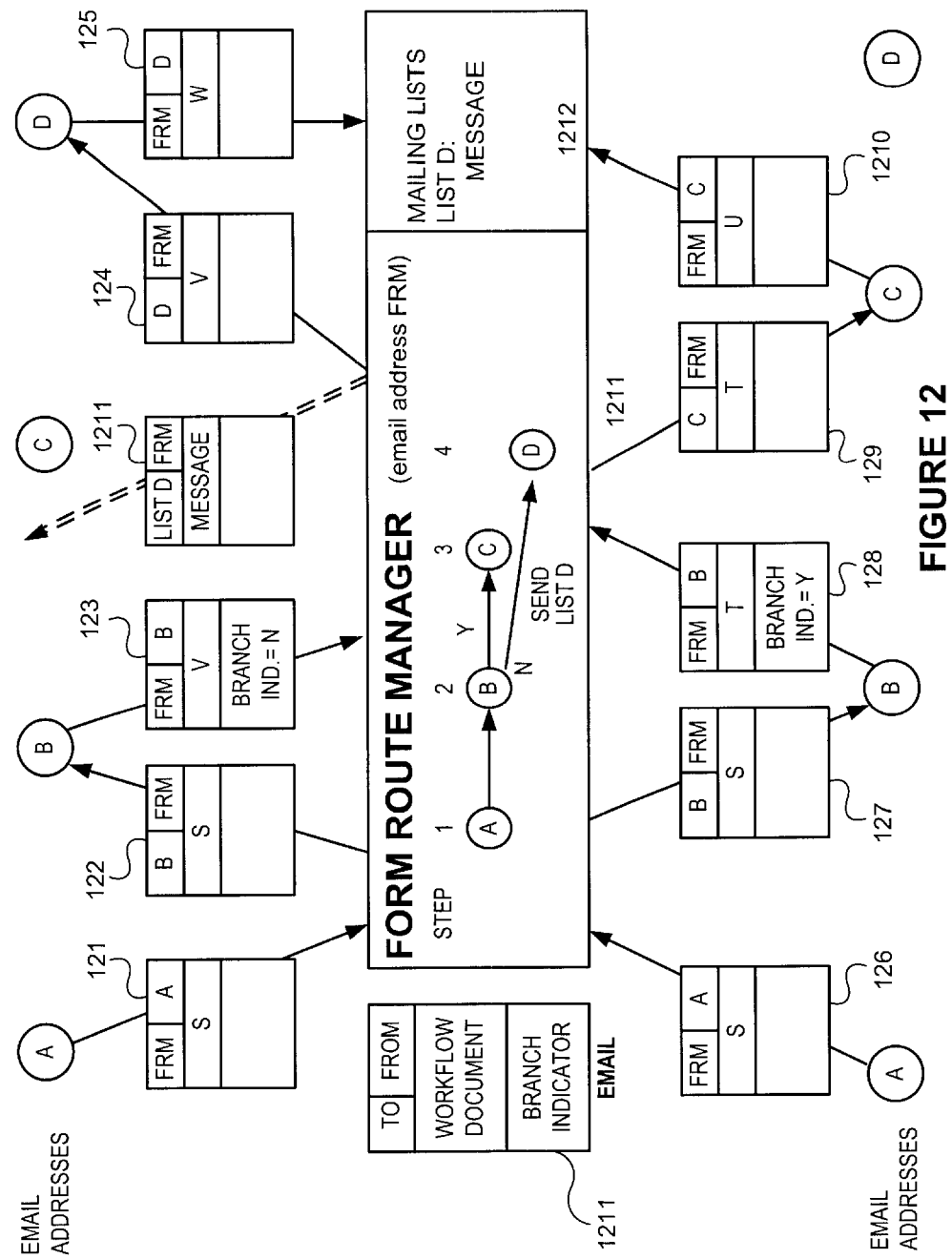
FIG. 12 is a block diagram and sequence of e-mails illustrating the function to send an e-mail to a specified list of e-mail addresses when a branch of a CONDITIONAL BRANCH is selected.

In many businesses, the users like prompt notification when choices are made or process steps are completed. For example, the traveler seeking reimbursement would like to be promptly notified if the manager denies the business travel reimbursement request. FIG. 12 illustrates a route that specifies that a set of e-mails are to be sent to a distribution list if the user at e-mail address B sets the BRANCH INDICATOR=N. A similar function extends to the CONDITIONAL CANCEL function. The route cotains a SEND MESSAGE 1211 field that indicates when a message is to be sent. The route is represented by SQL TABLE MESSAGE where the message is to be sent to LIST D, a list of e-mail addresses, if ROUTE BRANCH N is set at STEP=2.

| SQL TABLE MESSAGE: | | | | |
|---|---|---|---|---|
| STEP | NEXT E-MAIL ADDRESS | NEXT STEP | BRANCH ROUTE | SEND MESSAGE |
| 1 | B | 2 | | |
| 2 | C | 3 | Y | |
| 2 | D | 4 | N | LIST D |
| 3 | NULL | NULL | | |
| 4 | NULL | NULL | | |

In FIG. 12, the e-mail sequence 121 and 122 transmits the document from the user at e-mail address A to e-mail address B. A user at e-mail address B sets BRANCH INDICATOR=N in e-mail 123. The form route manager determines that e-mail address D is next and sends e-mails 1211 to the distribution list LIST D informing of the decision of the user at e-mail address B to set the BRANCH INDICATOR=N. E-mail sequence 126, 127, 128, 129 and 1210 illustrates where BRANCH INDICATOR=Y was set at step 2 and informational messages are not sent.

Figure 13:
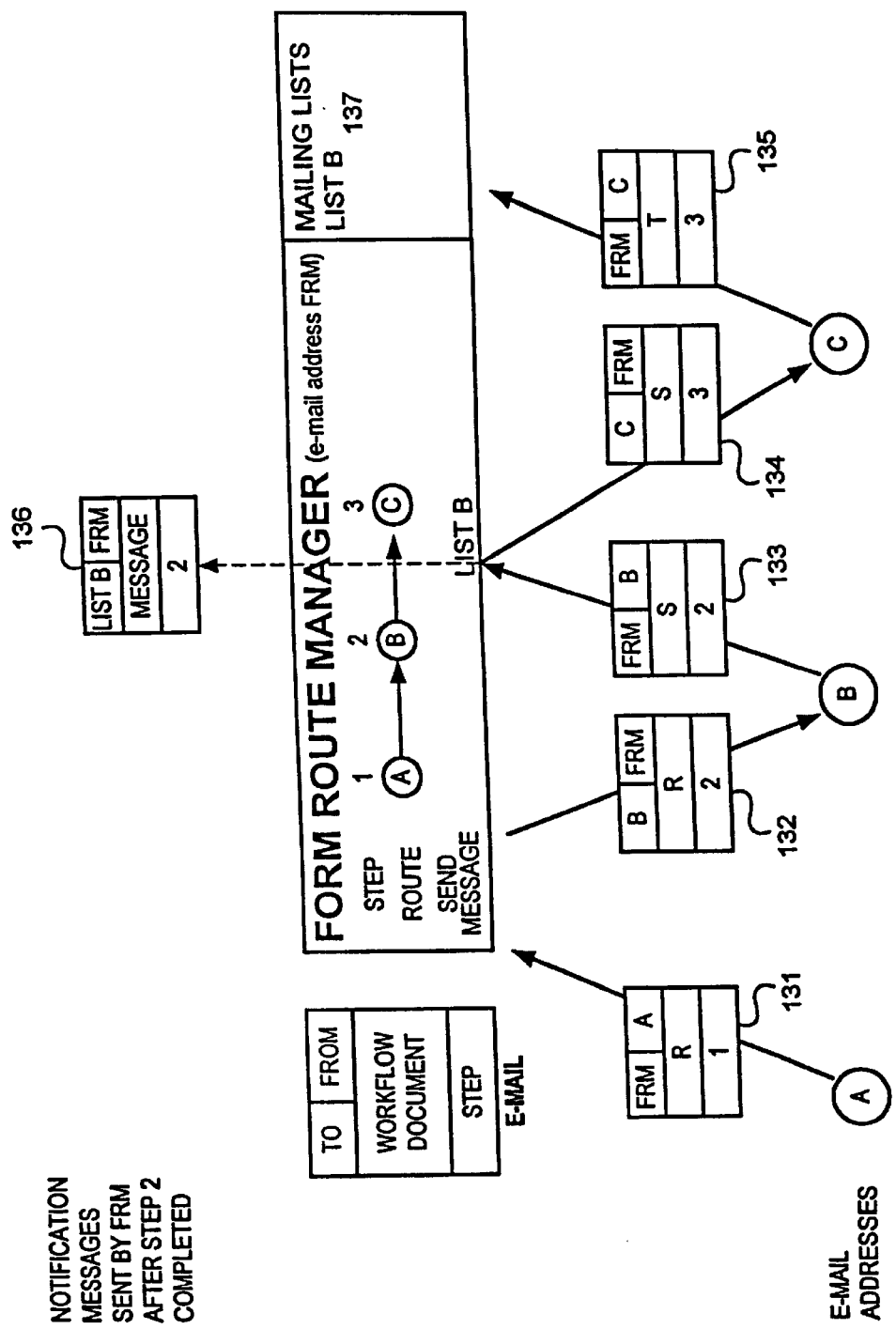
FIG. 13 is a block diagram and sequence of e-mails illustrating the function to send an e-mail to a specified list of e-mail address when the workflow passes a specific step in the route.

It may be desirable to have the e-mails sent when the workflow reaches a specific step. FIG. 13 illustrates a route where a set of e-mails 136 are sent to a mailing list 137, a list of e-mail addresses, when step 2 is completed by the user at e-mail address B and e-mail 133 is received by the form route manager. Those skilled in the art will realize notifications are not limited to e-mail mail but may involve phone pages, voicemail, facsimile, or other notifications.

Reimbursement Approval Procedure

We now defined the necessary functions to implement the travel reimbursement approval procedure. The route for the procedure in FIG. 7 is illustrated in SQL TABLE TRAVELER. The traveler is P1, the manager is P2, and accounting is P3.

| SQL TABLE TRAVEL: | | | | |
|---|---|---|---|---|
| STEP | NEXT E-MAIL ADDRESS | NEXT STEP | BRANCH ROUTE | SEND MESSAGE |
| 1 | P2 | 2 | | |
| 2 | P3 | 3 | APPROVE | |
| 2 | P1 | 4 | CLARIFY | |
| 2 | NULL | NULL | CANCEL | P1 |
| 3 | NULL | NULL | | P1 |
| 4 | P2 | 2 | SUBMIT | |
| 4 | NULL | NULL | CANCEL | P2 |

In the first row, the document is sent to P2. The next three rows provide P2 with the choice of approving the document and sending it to P3, or sending the document back to P1, or canceling the workflow and sending a message to P1. The fifth row is the completion of the workflow by P3. The sixth and seventh rows provide P1 with the choice of sending the document to P2 or canceling the workflow and sending a message to P2. The e-mail format uses STEP.DOC, and BRANCH INDICATOR control fields. The DOC field enables tracking of each document using the LOCATION table and MOVE HISTORY table. These tables provide real time location of the document and statistical information on each document and collection of documents. The BRANCH INDICATOR field permits P1 and P2 to implement their choices.

Workflow Routes and Organizational Knowledge Base

Figure 14:
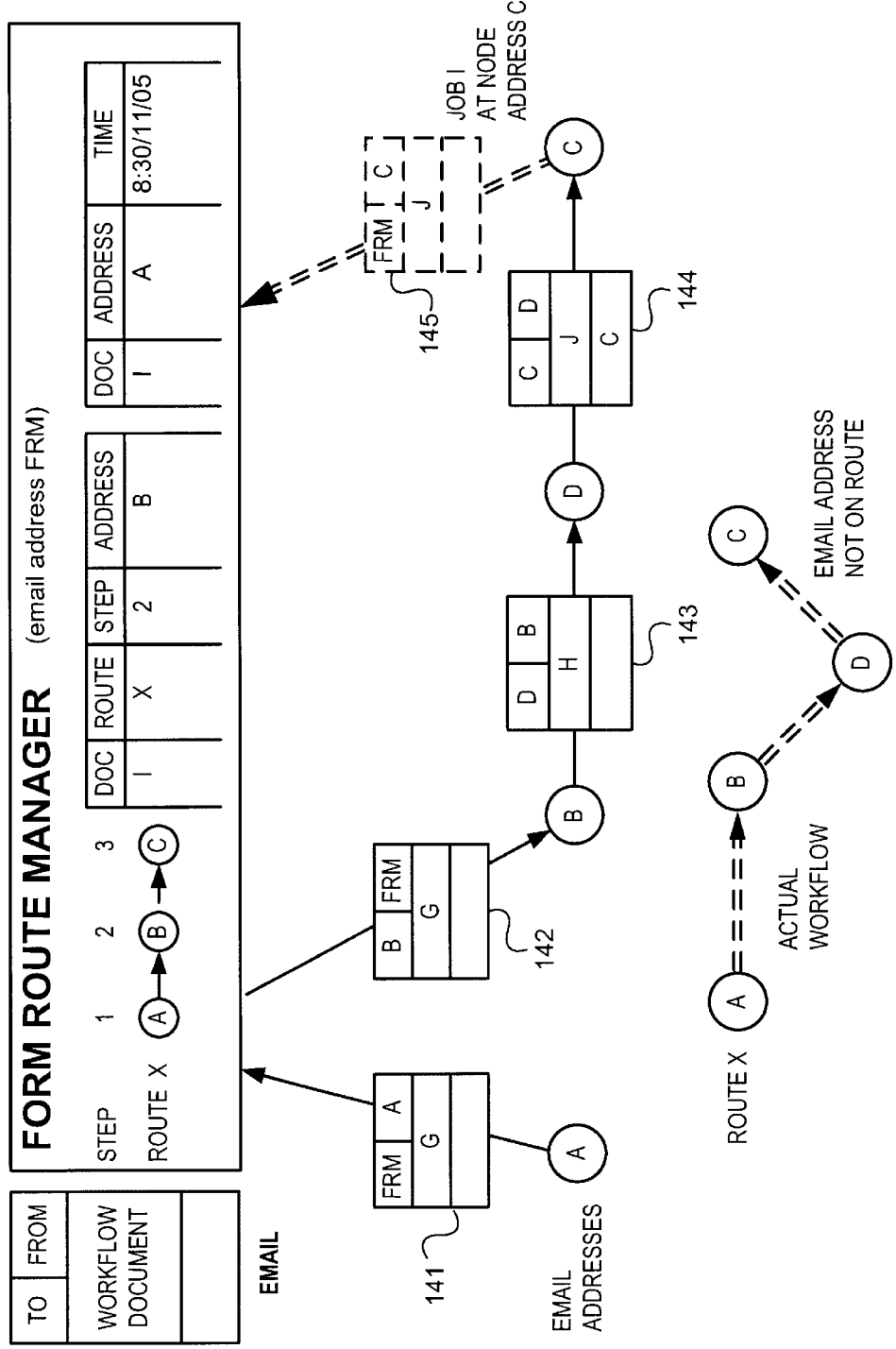
FIG. 14 is a block diagram and sequence of e-mails illustrating the sending of an e-mail to a user not on route and not tracked by form route manager.

The workflow e-mails appear in some respects as e-mails to the e-mail system. Thus, a user can send a workflow e-mail to anyone on the computer network and not just back to the form route manger. If the workflow is tracked by the form route manager in the LOCATION and MOVE HISTORY tables, the form route manager can only track the e-mail to the last user to whom it had sent the e-mail. In FIG. 14, a user at e-mail address B sends a workflow e-mail 143 to e-mail address D rather than to the form route manager. A user at e-mail address D sends the e-mail 144 to e-mail address C, but the form route manager can only track the e-mail to e-mail address B, the last e-mail address that the form route manager sent the e-mail. The expectation is that the user at e-mail address C will send the e-mail 145 to the form route manager.

Redefining the Workflow Route to Obtain an Optimal Set of Users

It may be desirable to send workflow e-mail to a user not on the predetermined route. In the past, many workflow applications were for routine processes making it easy to predefine the route and users to carry out the process. Now, however, many people have a role in our knowledge-based society imposing different constraints on workflow. Unlike the routine processes of the past, the best route may not be clear at the outset. The present invention addresses this problem by providing a way to dynamically redefine the route based on choices made by the users on the route to better harness the ever-changing knowledge of the organization. This ability to redefine the route at the user level is of great value.

In one embodiment, the system opens workflow to anyone on the e-mail system and not just those originally specified in the route. Thus, an individual in the route can send an e-mail to others who may have information which adds value to the workflow. This is very advantageous as it is difficult to establish the optimal set of experts for knowledge-based processes. However, the users on the route can typically identify others who should be added to the route. Thus, in one embodiment, the system provides workflow which tracks the actual route and captures the actual route as defined by the user community. This permits an organization to leverage its knowledge of the organization and use the workflow as the "memory" of successful workflows. This ability to go off route and capture the optimal route permits the workflow to track the evolving knowledge of the organization.

Capturing Actual Workflow Routes

Figure 15:
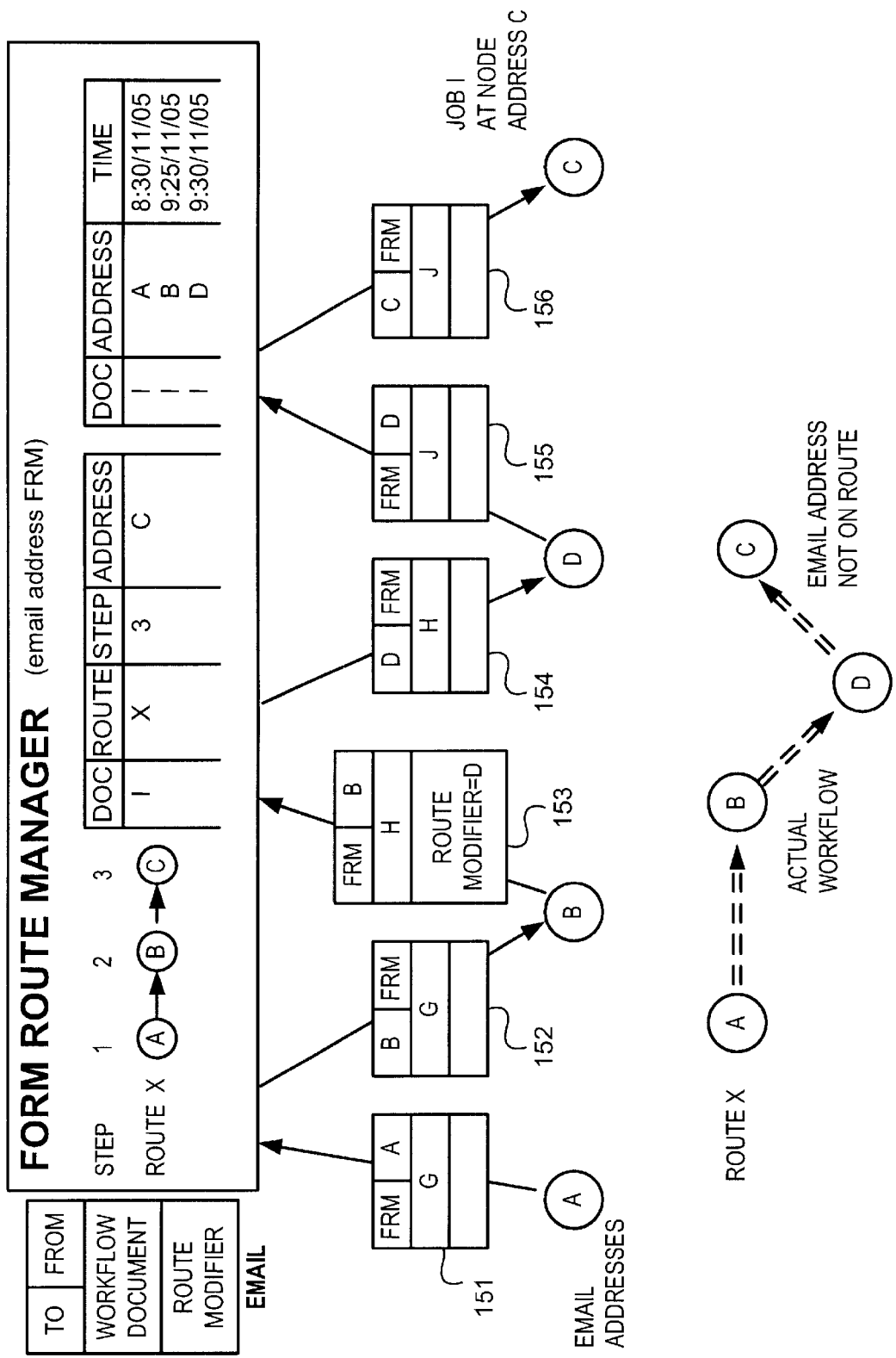
FIG. 15 is a block diagram and sequence of e-mails illustrating the sending of an e-mail to a user not on route but tracked by form route manager.

To track e-mail, the form route manager must be part of the e-mail message workflow. The ROUTE MODIFIER control field in workflow e-mail provides this mechanism. If the ROUTE MODIFIER is assigned an e-mail address, the form route manager sends the e-mail to this e-mail address and tracks it by updating the LOCATION and MOVE HISTORY tables. As shown in FIG. 15, route X flows from e-mail address A to e-mail address B to e-mail address C. The route that is executed, the actual route, includes the user at e-mail address D. The e-mail sequence 151 and 152 sends the e-mail from the user at e-mail address A to e-mail address B. The user at e-mail address B sends e-mail 153, with the ROUTE MODIFIER set to e-mail address D and to the form route manager. The form route manager updates the LOCATION and MOVE HISTORY tables to reflect that it sent the workflow e-mail 154 to e-mail address D. A user at e-mail address D returns e-mail 155 to the form route manager and the form route manager determines the next user on the route e-mail address C, updates the tables, and sends e-mail 156 to e-mail address C.

Figure 16:
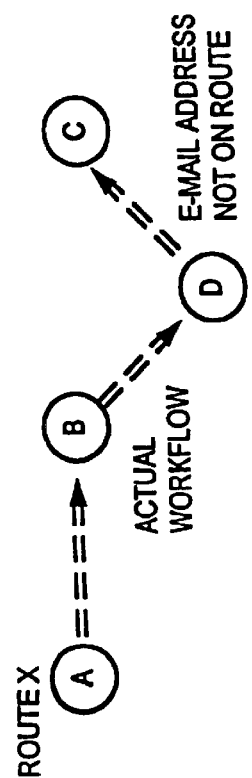
FIG. 16 is a block diagram and tables to create a new route based on the move history table.
Figure 16:

At the completion, the MOVE HISTORY table holds the exact sequence of e-mail addresses for a specific document. As illustrated in FIG. 16, the MOVE HISTORY table can be used to create a new route based on the route actually executed. The MOVE HISTORY can be used directly or can be edited to prune and/or extend to people not in the MOVE HISTORY table to help the evolution of a procedure. Thus, the original route specified A to B to C, the route created from the MOVE HISTORY table specifies A to B to D to C, where D was added to the original route.

A Two Form Route Manager Workflow System

It may be desirable to have the route and tracking of workflow separated into two or more form route managers. For example, a workflow may cross two widely separated sites and the delay of e-mail transfer may impact the performance of the workflow. Another application is when the workflow route is separated so that each route segment can evolve without impacting the other route segment. A third application is where a workflow may start in one company and continue in another company. Finally, the two route managers may backup one another.

Figure 17:
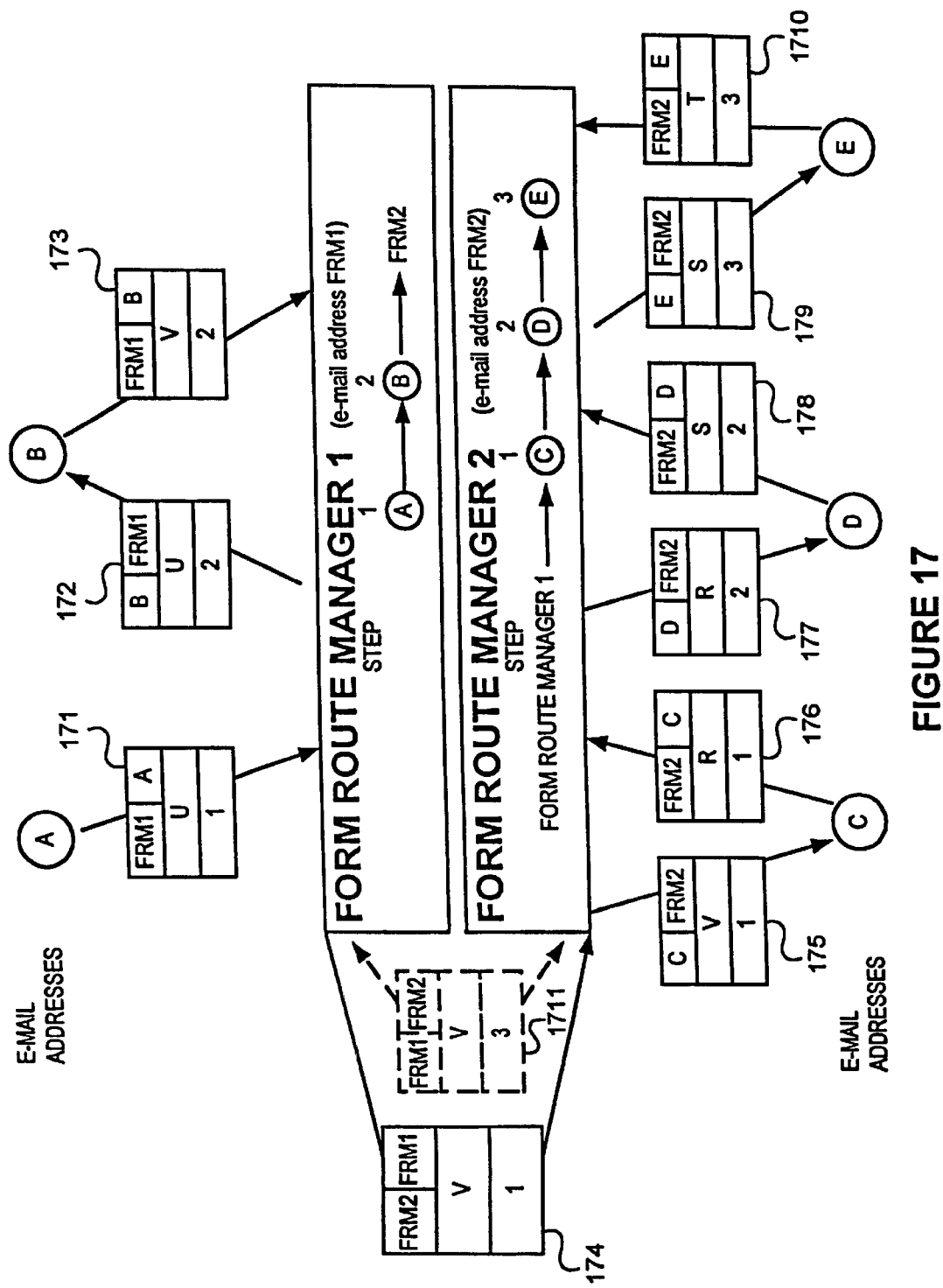
FIG. 17 is a block diagram and sequence of e-mails illustrating the cooperative functions of two form route managers to support a route that starts in one and continues in the other.

FIG. 17 illustrates a workflow route segment that begins in form route manager 1 from e-mail address A, to e-mail address B, then to a second route segment in form route manager 2, e-mail address C, e-mail address D, and finally to e-mail address E. In one implementation, the SQL table in form route manager 1 representing route segment 1 is iust as SQL table ROUTE SEGMENT ONE and the route segment 2 in form route manager 2 is illustrated as SQL table ROUTE SEGMENT TWO.

SQL TABLE ROUTE SEGMENT ONE:

| STEP | NEXT E-MAIL ADDRESS | NEXT STEP |
| --- | --- | --- |
| 1 | B | 2 |
| 2 | form route manager 2 | 3 |
| 3 | NULL | NULL |

SQL TABLE ROUTE SEGMENT TWO:

| STEP | NEXT E-MAIL ADDRESS | NEXT STEP |
| --- | --- | --- |
| 1 | C | 2 |
| 2 | D | 3 |
| 3 | E | 4 |
| 4 | NULL | NULL |

The e-mail sequence 171, 172, and 173 transfers the e-mail from e-mail address A to e-mail address B. The e-mail 174 is used to transfer the e-mail between form route manager 1 and form route manager 2. The STEP field in e-mail 174 is set to the initial step, STEP=1, for route segment 2 by form route manager 1. Form route manager 2 sends the e-mail 175 to e-mail address C to continue route segment 2 and e-mail 1711 to form route manager 1 to confirm the transfer to route segment 2. The e-mail 1711 with STEP=3 is required if the form route manger 1 has a LOCATION and MOVE HISTORY TABLE to signify that route segment 1 is complete. E-mail 1711 can be used to confirm the receipt of e-mail 174 by form route manager 2. The e-mail sequence 176, 177, 178, 179, and 1710 transfers the e-mail from e-mail address C to e-mail address D to e-mail address E.

Complex Routes with Fork Branching, Parallel Routes, and Joining of Routes

Figure 18:
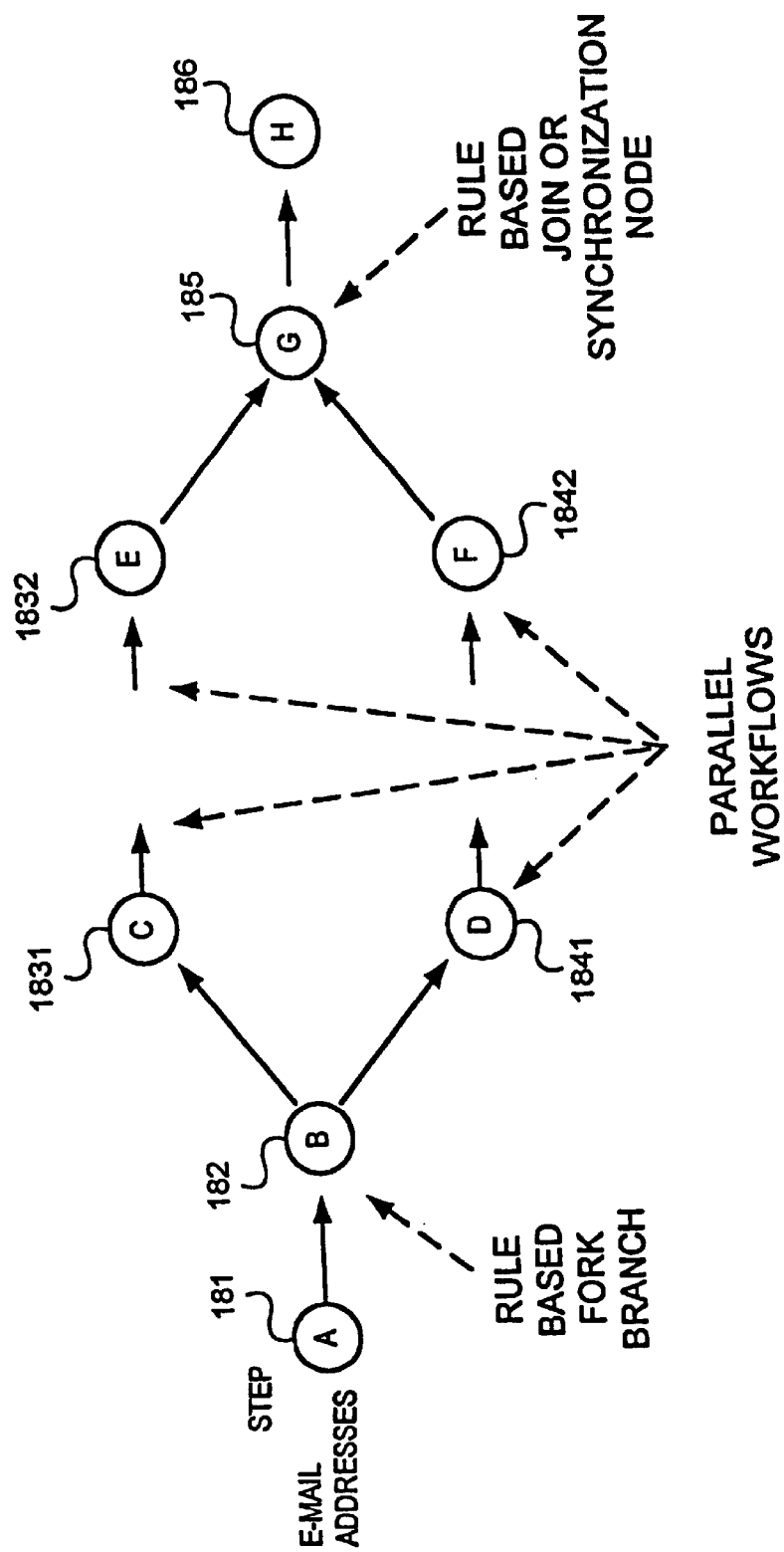
FIG. 18 is a block diagram illustrating the FORK and JOIN functions and parallel branch routes in a route.

In complex workflow, it may be highly desirable to have a route split into two or more parallel branch routes that proceed independently of each other. It may be also desirable to bring parallel branch routes together to synchronize workflow or to combine into a single or smaller number of routes. These concepts are illustrated in FIG. 18. The function of splitting a route into branch routes, called a FORK, occurs when the route at the user at e-mail address B 182 splits into two branch routes to e-mail address C 1831 and to e-mail address D 1841. The combination function called a JOIN occurs at e-mail address G 185 where the branch routes from the e-mail address E 1832 and e-mail address F 1842 join together. FORKS and JOINS can be based on rules to provide a high degree of flexibility while still automating the procedures. A FORK can result in parallel branch routes while a CONDITIONAL BRANCH directs flow to one of several choices.

The rules to activate branch routes need not activate all of the branch routes but can activate a subset of the branch routes depending on the result of the rules. As an example, assume there are four branch routes, W, X, Y, and Z and Rule 1 and Rule 2 apply at a FORK. Rule 1 can specify conditions that when satisfied activate branch routes W and X in parallel by sending an e-mail to the first e-mail address in branch route W and an e-mail to the first e-mail address in branch route X. Rule 2 can specify conditions that when satisfied activate branch routes W, Y, and Z in parallel by sending e-mails to the first e-mail addresses in branch routes W, Y, and Z.

In an example, the JOIN rule may be employed in a situation where parallel approval is required such as that where both fixed asset approval and finance approval is required to continue a purchase approval procedure. In general, these rules may be generalized to include Boolean functions, voting, weighted votes, and unconditional joins.

Figure 19:
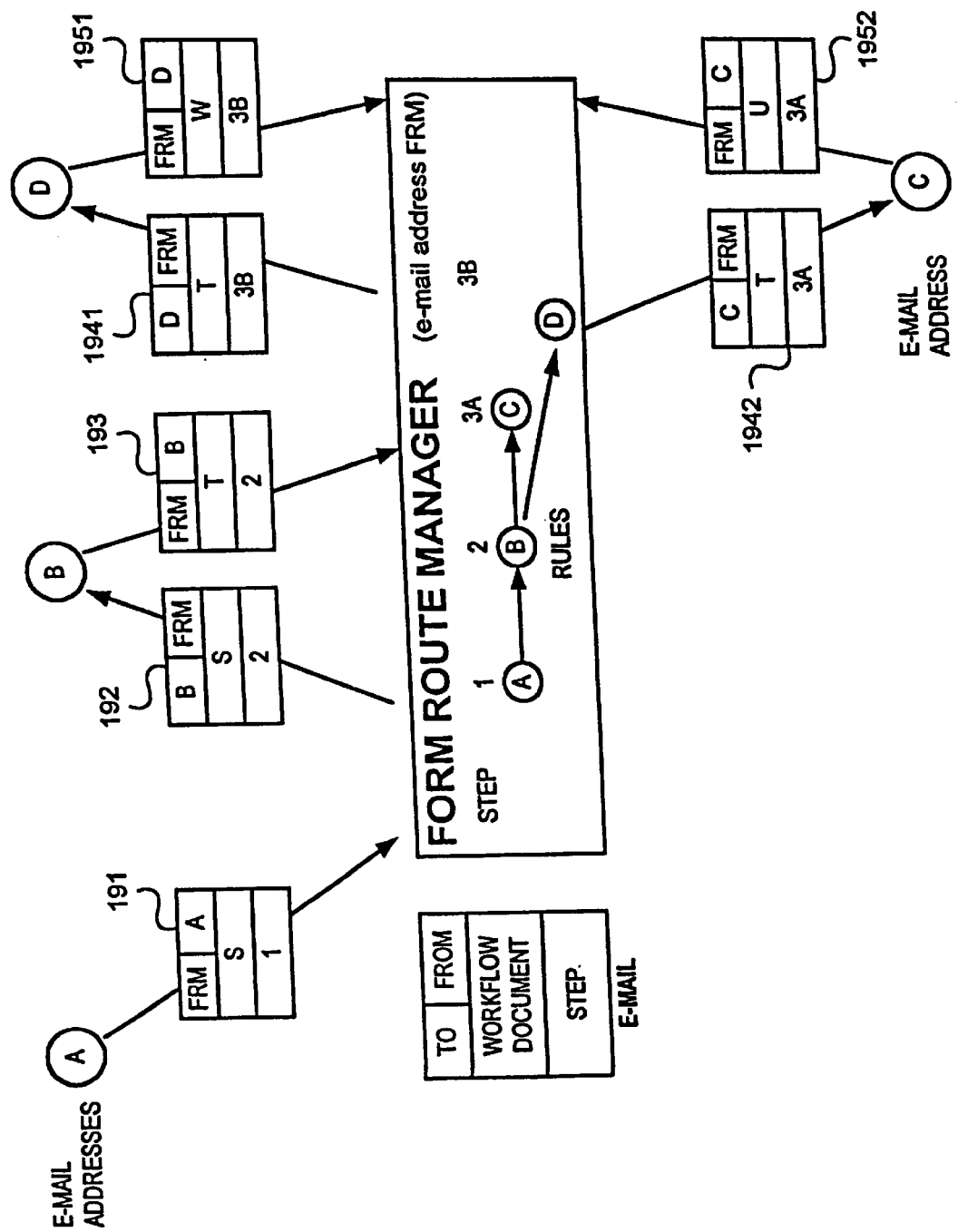
FIG. 19 is a block diagram and sequence of e-mails illustrating rule based FORK branch function.

FIG. 19 illustrates the route and sequence of e-mails to effect a FORK at e-mail address B. In one embodiment, a FORK ROUTE is shown in SQL TABLE FORK below. The FORK/JOIN column indicates when two or more rows at the same step produce parallel workflow routes by use of the word "FORK".

SQL TABLE FORK:

| STEP | NEXT E-MAIL ADDRESS | NEXT STEP | FORK/JOIN |
| --- | --- | --- | --- |
| 1 | B | 2 | |
| 2 | C | 3A | FORK |
| 2 | D | 3B | FORK |
| 3A | NULL | NULL | |
| 3B | NULL | NULL | |

At step or row 1, the form route directs the e-mail to e-mail address B. Rows two and three have the same step number and the key word FORK in the FORK/JOIN column. At step 2, the form route manager generates a parallel workflow by sending e-mail to both e-mail address C and to e-mail address D. If the form route manager contains the LOCATION table and MOVE HISTORY table, each parallel route would have an entry in the LOCATION table. The document identifier can be augmented with a suffix to distinguish between the location and move history of the parallel routes. Those skilled in the art will recognize after review of the present application that alternative data structures can represent the information required for the parallel route and tracking functions.

In FIG. 19, the e-mail sequence 191, 192, and 193 transfers the workflow document from e-mail address A to the form route manager to e-mail address B to the form route manager. The form route manager copies the e-mail 193 and sends a copy e-mail 1941 to e-mail address D and a copy e-mail 1942 to e-mail address C so that C and D can process the document in parallel.

Figure 20:
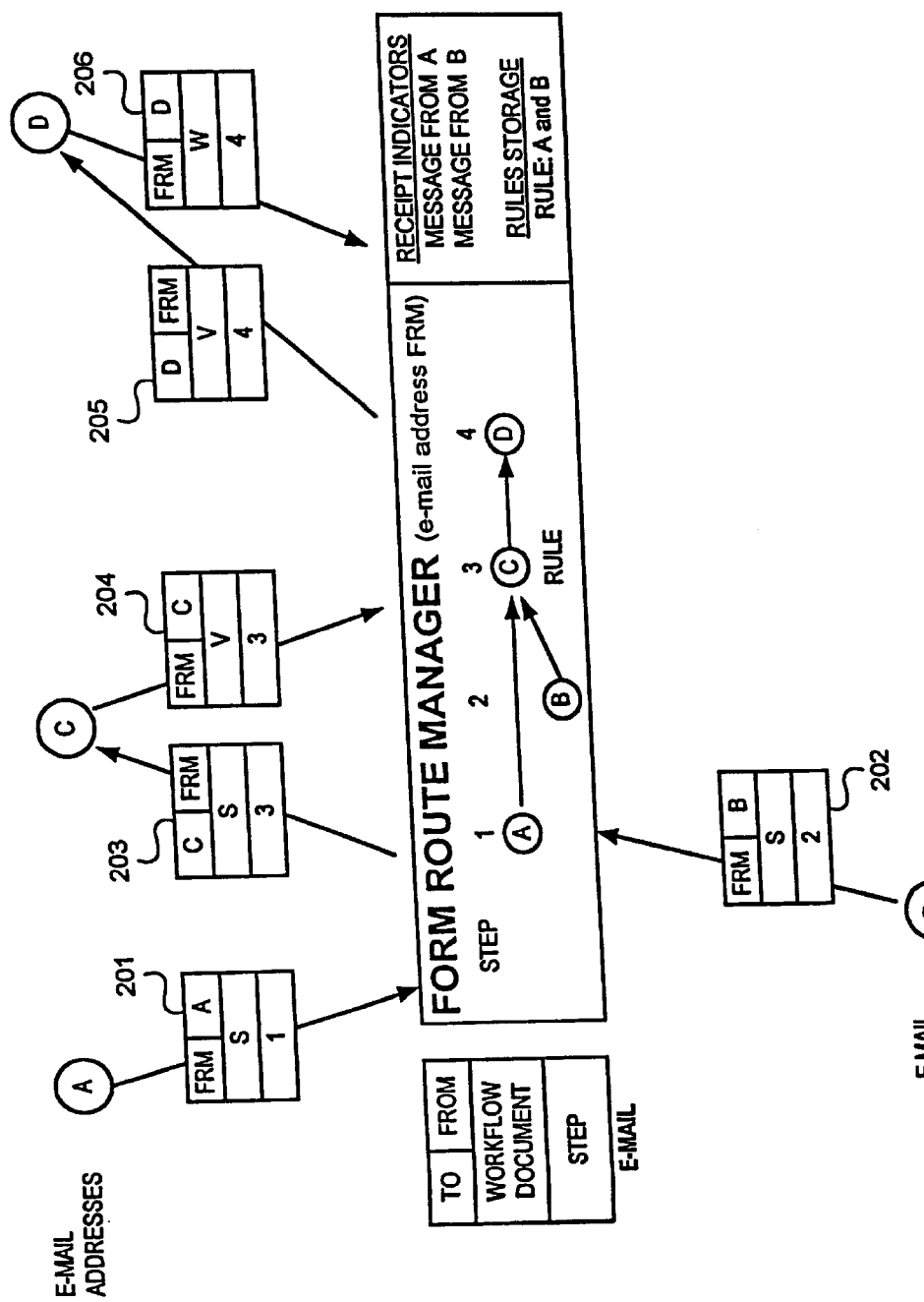
FIG. 20 is a block diagram and sequence of e-mails illustrating rule based JOIN function.

In FIG. 20, the route specifies a JOIN at e-mail address C. The route stmcure is illustrated in SQL TABLE JOIN where a row with the key word "JOIN" in the FORK/JOIN column is used to signify where two or more parallel routes join.

| SQL TABLE JOIN: | | | |
|---|---|---|---|
| STEP | NEXT E-MAIL ADDRESS | NEXT STEP | FORK/JOIN |
| 1 | C | 3 | JOIN |
| 2 | C | 3 | JOIN |
| 3 | D | 4 | |
| 4 | NULL | NULL | |

The e-mail 201 from the user at e-mail address A and the e-mail 202 from the user at e-mail address B must be received by the form route manager before sending the e-mail 203 to e-mail address C. Thus, the join function is similar to an AND logic gate. The form route manager has memory to save receipt indicators of the asynchronous receipt of e-mails 201 and 202 before sending the e-mail to e-mail address C. The form route manager receives either e-mail 201 or 202 and sets an indicator to show one e-mail was received and checks the other indicator to determine if the other e-mail was received. The SQL table MESSAGE RECEIVED illustrates a data structure that implements this function when message 201 was received.

| SQL TABLE MESSAGE RECEIVED: | |
|---|---|
| STEP | RECEIVED |
| 1 | 201 |
| 2 | |

Since message 202 had not been received, the form route manager begins processing the next e-mail. When message 202 is received, the form route manager sends e-mail 203 to the next step in the route, e-mail address C. For multiple documents using the join function, each message and the SQL table MESSAGE RECEIVED would require an additional field, DOC, to distinguish between the use of join flags among the documents. Those skilled in the art will recognize after review of the present application that different data structures could be devised to accomplish this function.

Fault Detection and Recovery

Figure 21:
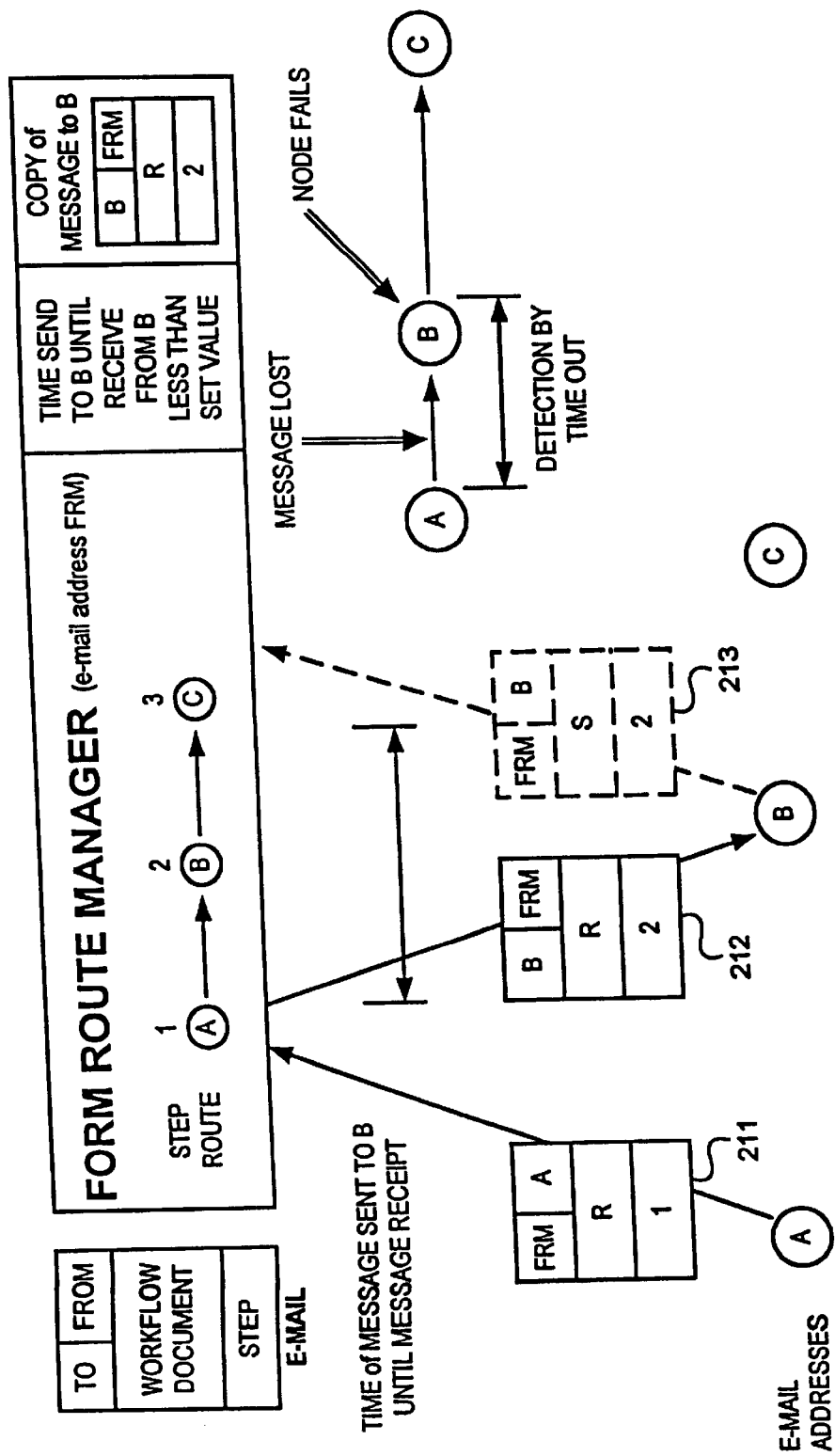
FIG. 21 is a block diagram and sequence of e-mails illustrating error detection using timed intervals and error recovery of a lost e-mail using a stored copy of the e-mail.

Workflow requires the cooperation of independent PCs and the e-mail system. A workflow can be delayed, for example, by a user not timely performing his step, or by an e-mail being lost by a faulty e-mail system. A fault detection mechanism can measure the time between the sending of an e-mail to a user and the receipt of the return e-mail as illustrated in FIG. 21. There e-mail 212 is sent and the form route manager clocks the waiting period for the receipt of the e-mail 213. If the time exceeds a predetermined interval, a potential fault is detected. Recovery could be resending the e-mail, sending a notification e-mail to another e-mail address or list of e-mail addresses, sending an e-mail to an e-mail address C next on the route, an e-mail to the e-mail address A who initiates the workflow, an e-mail to the manager of a user at e-mail address B who is not responding, or sending a telephone page to a phone number or set of numbers, or sending a FAX to a number or set of numbers. In some of these failures, the e-mail will be lost. Because many e-mail systems hold images of e-mails sent by a client, the form route manager can store images of the sent e-mails to recover the lost e-mail. For example, Lotus cc:Mail has an e-mail log that can be used to recover lost e-mails. Many e-mail and e-mail systems also have extensive backup and recovery mechanisms to recover from system outages. The form route manager may use these mechanisms to recover from e-mail failures.

The form route manager can be implemented using relational database management, RDBM, technologies. RDBM has extensive error detection and recovery mechanisms and permits eas implementation of high reliability structures such as mirrored, duplicated hardware and replicated, redundant databases. With the use of these technologies, the form route manager can be implemented to be highly reliable.

Figure 22:
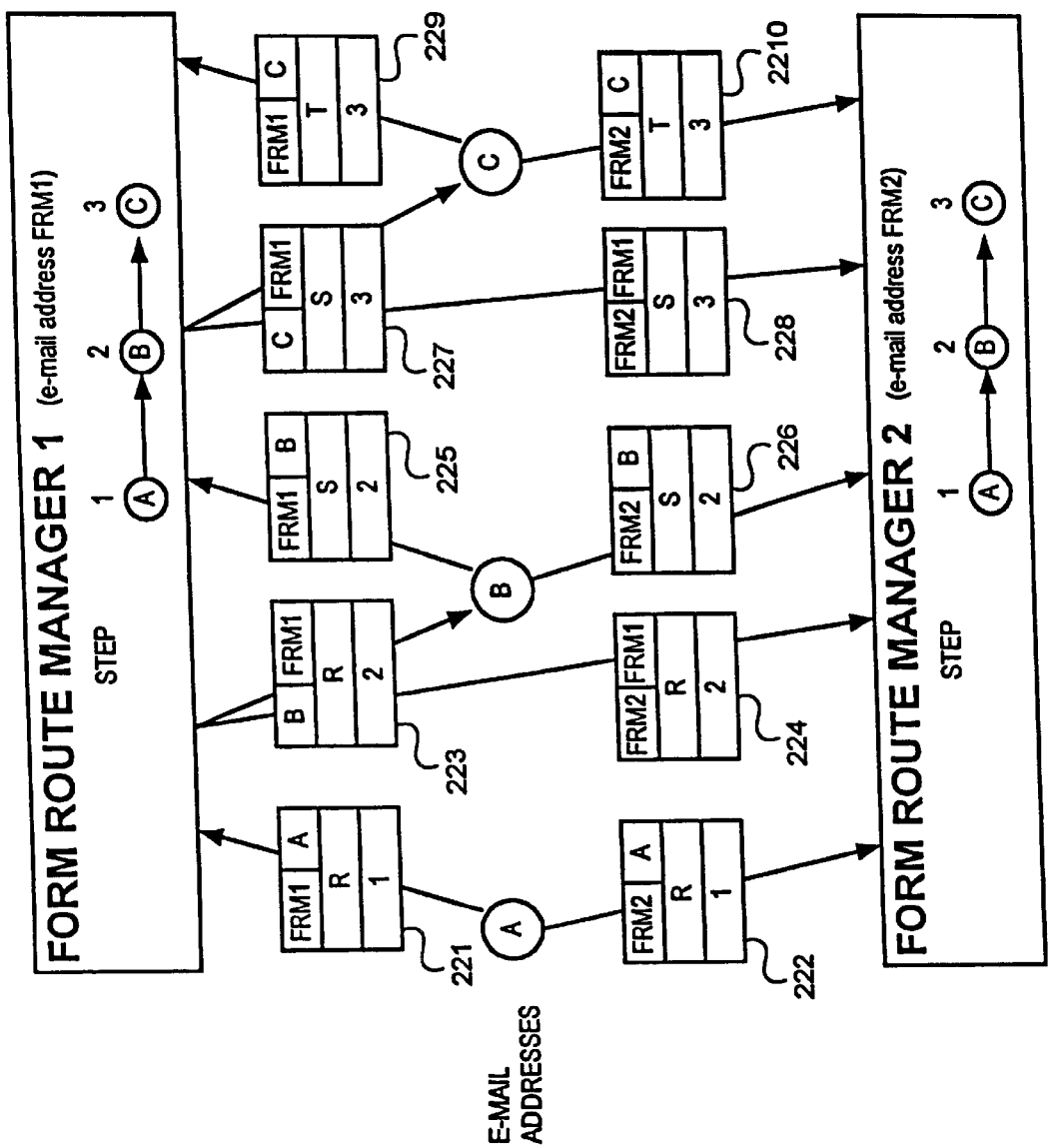
FIG. 22 is a block diagram and sequence of e-mail illustrating one form route manager backing up another form route manager.

As mentioned, the e-mail system may be used so that two form route manager units can be backup units for each other, and this is illustrated in FIG. 22. Each workflow e-mail is addressed to the second form route manager as well as the e-mail address to which the e-mail is sent. This ensures that the second form route manager has a copy of the e-mail and can track the progress of the workflow with respect to the form route manager which sent the e-mail. Many e-mail systems can address a message to a list of e-mail addresses or can provide a courtesy copy of the e-mail to another e-mail address. The user at e-mail address A can send e-mail 221 to form route manager 1 and e-mail 222 to form route manager 2. Form route manager 1 sends an e-mail 223 to the e-mail address B and an e-mail 224 to form route manager 2. When the user at e-mail address B completes the process step, the e-mail is sent back using the REPLY ALL function available in many e-mail systems that will send the e-mail to the sender and all the addressees on the original e-mail. This will send an e-mail 225 to the form route manager 1 and an e-mail 226 to the form route manager 2. This permits form route manager 2 to track the workflow. The form route manager 1 sends the e-mail 227 to the e-mail address C and e-mail 228 to form route manager 2. The user at e-mail address C sends e-mail 229 to form route manager 1 and e-mail 2210 to form route manager 2 using the REPLY ALL function. If form route manager 1 fails, form route manager 2 is ready and synchronized with the workflow. The e-mail addresses can use the REPLY ALL function and send e-mails to both form route managers, because the e-mails to the failed form route manager will be queued in the e-mail system. Because the two form route managers need not be physically close, the form route managers can be spaced miles apart to ensure a catastrophe does not affect system reliability.

Workflow Document Format Changed by Form Route Manager Based on Route

In certain workflows, it is desirable to control what data each user in the procedure can see, enter, or modify based on the step in the route. The form to be used may be specified in the route. The form route manager holds a set of document templates in a forms library that are used as e-mail formats. This may require that the form route manager extract data from an e-mail it receives and insert it into an e-mail form that it is sending. The route has a form field associated with a route step that designates the form to be used for that step. For FIG. 23, the SQL TABLE FORMS illustrates the route structure to implement the forms function.

| SQL TABLE FORMS: | | | |
|---|---|---|---|
| STEP | NEXT E-MAIL ADDRESS | NEXT STEP | NEXT FORM |
| 1 | B | 2 | W |
| 2 | C | 3 | X |
| 3 | NULL | NULL | |

Figure 23:
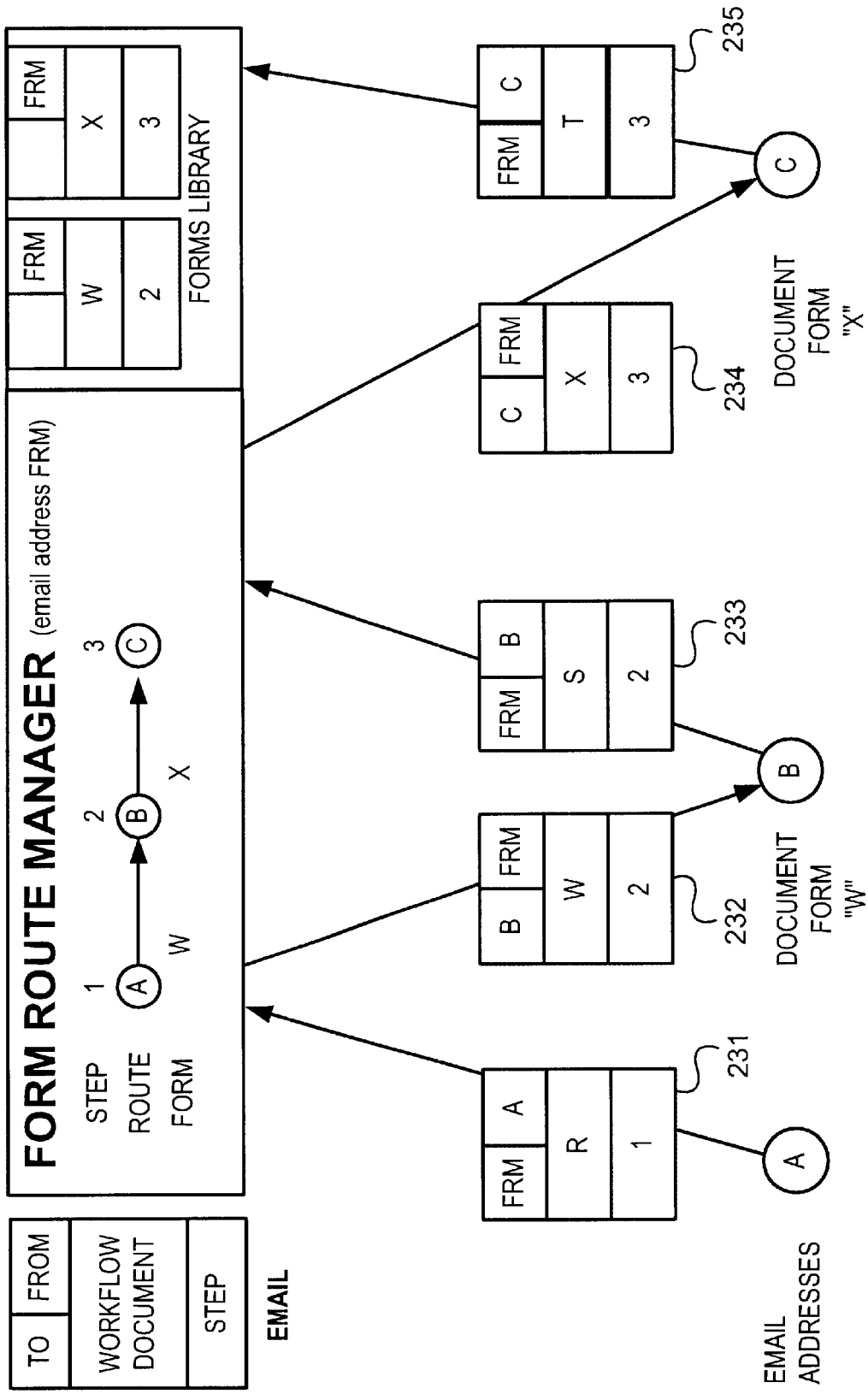
FIG. 23 is a block diagram and sequence of e-mails illustrating the document format change by form route manager based on the route.

In FIG. 23, the form route manager receives e-mail 231 from a user at e-mail address A in format R, determines from the NEXT FORM field for the next step 2 in the route that document format W is to be used and sends e-mail 232 to e-mail address B in format W. In similar fashion, e-mail 233 received in format S is mapped to format X for e-mail 234 to e-mail address C.

Workflow Status, Route Editing, and Document Forms Request E-mails

Figure 24:
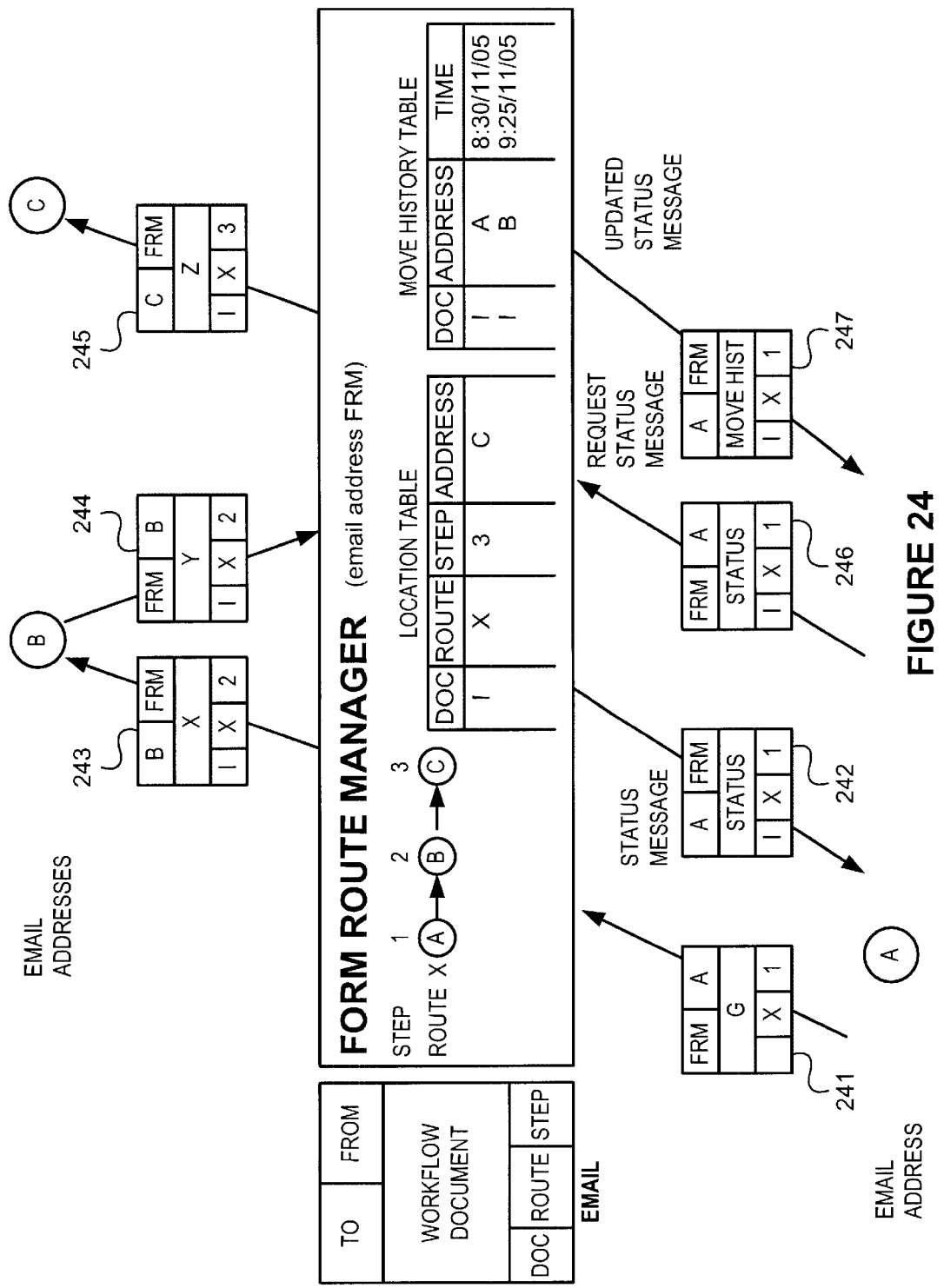
FIG. 24 is a block diagram and sequence of e-mails illustrating the STATUS REQUEST and the response and use of e-mail REPLY functions for users to obtain status on documents.

Users in workflow may want information on the progress or the statistics of the workflow, such as the average process time. However, many of the users are not connected to the form route manager and only have access using e-mail. The critical parameter for such information is the value of DOC, the index for the LOCATION and MOVE HISTORY tables. Each document has a unique DOC value. In certain embodiments, the users must save the value of DOC if they want to get status on the document. To facilitate e-mail access, a set of e-mail formats are illustrated in FIG. 24. In response to an e-mail 241, having a control field STATUS, and sent by a user at e-mail address A, an e-mail 242 is sent by the form route manager to e-mail address A with the STATUS and the DOC=I at the same time as the e-mail 243 is sent to the e-mail address B. A user at e-mail address A saves e-mail 242 for later use to request status on this document. The e-mail sequence 244 and 245 advances the document to e-mail address C. A user at e-mail address A requests the status of the document by sending e-mail 246 to form route manager by using the REPLY function on the e-mail 242 that was saved earlier. The form route manager responds with e-mail 247 with the LOCATION and MOVE HISTORY for the document with DOC=I. A user at e-mail address A can save e-mail 247 and use it or e-mail 242 to request subsequent status.

Because many workflow users are connected to the form route manager just through the e-mail system, the present invention provides a way to create or edit the route and e-mails for a workflow by use of e-mails. A request for e-mail to the form route manager returns a route and e-mails documents that may be used to create a new route and e-mails for a new procedure or to edit a route or form for an existing procedure. The document edited in the PC is sent back to the form route manager to be added to the library of procedures, routes, and forms. It may be desirable to have a security system that permits only those with the correct password or user address to modify or add routes and forms.

The workflow may be initiated from a PC, terminal, or workstation by sending a workflow e-mail to the form route manager. One of ordinary skill would understand after review of the present application, that the computers at each e-mail address can encompass any device with a display and input, including hand-held and portable terminals, bar code readers, radio frequency, infrared, and ultraviolet-connected terminals, and other input/output devices that may participate in business procedures. The initial workflow document e-mail can be obtained from the form route manager by sending a request e-mail for blank workflow e-mails for each of the active procedures. The form route manager responds with a list of procedures that may be initiated by that user. The user edits the list and sends it back to the form route manager. The form route manager then responds with workflow document e-mails in their initial state as requested. These may be used immediately or saved by the user in their mail log for later use. Alternatively, the e-mail system can have blank initial e-mail forms that were sent by the form route manager in folders. Users can initiate workflow processes by just selecting the appropriate e-mail, use the REPLY function to address the e-mail to the form route manager, fill in the form and send it. Since the e-mail was from the form route manager, the user need not address the e-mail if REPLY is used.

The workflow procedure can be initiated by a computing machine or system connected to the e-mail system. As an example, a company may have annual reviews. Human resources has the date of last review for each user and can initiate a review procedure for each user who has a last review date later than one year from the current date by sending a workflow document e-mail, with the appropriate HR information, to the form route manager to send to each manager who has an employee needing a review. Once initiated, the review procedure can be monitored to ensure that every employee receives their annual review.

Route Role Mapping to Users

The route for a procedure requires the e-mail address of the people who process each step. However, there may be a workflow that is the same but requires different people. Rather than creating a different route for each use, the route may have role symbols that are used to map to the actual e-mail address of the people who are to execute the procedure. For the business travel reimbursement example the roles are initiator, approver, and payor. The SQL TABLE ROLE ROUTE and SQL TABLE ROLES show the relationships for concepts illustrated in FIG. 25.

| SQL TABLE ROLE ROUTE: | | |
|---|---|---|
| STEP | NEXT ROLE | NEXT STEP |
| 1 | R2 | 2 |
| 2 | R3 | 3 |
| 3 | NULL | NULL |

| SQL TABLE ROLES: | | |
|---|---|---|
| PROJECT | ROLE | E-MAIL ADDRESS |
| Project 1 | R1 | A |
| Project 1 | R2 | B |
| Project 1 | R3 | C |
| Project 2 | R1 | D |
| Project 2 | R2 | E |
| Project 2 | R3 | F |
| Project 3 | R1 | TBD |
| Project 3 | R2 | MGR TBD |
| Project 3 | R3 | FIN |

Figure 25:
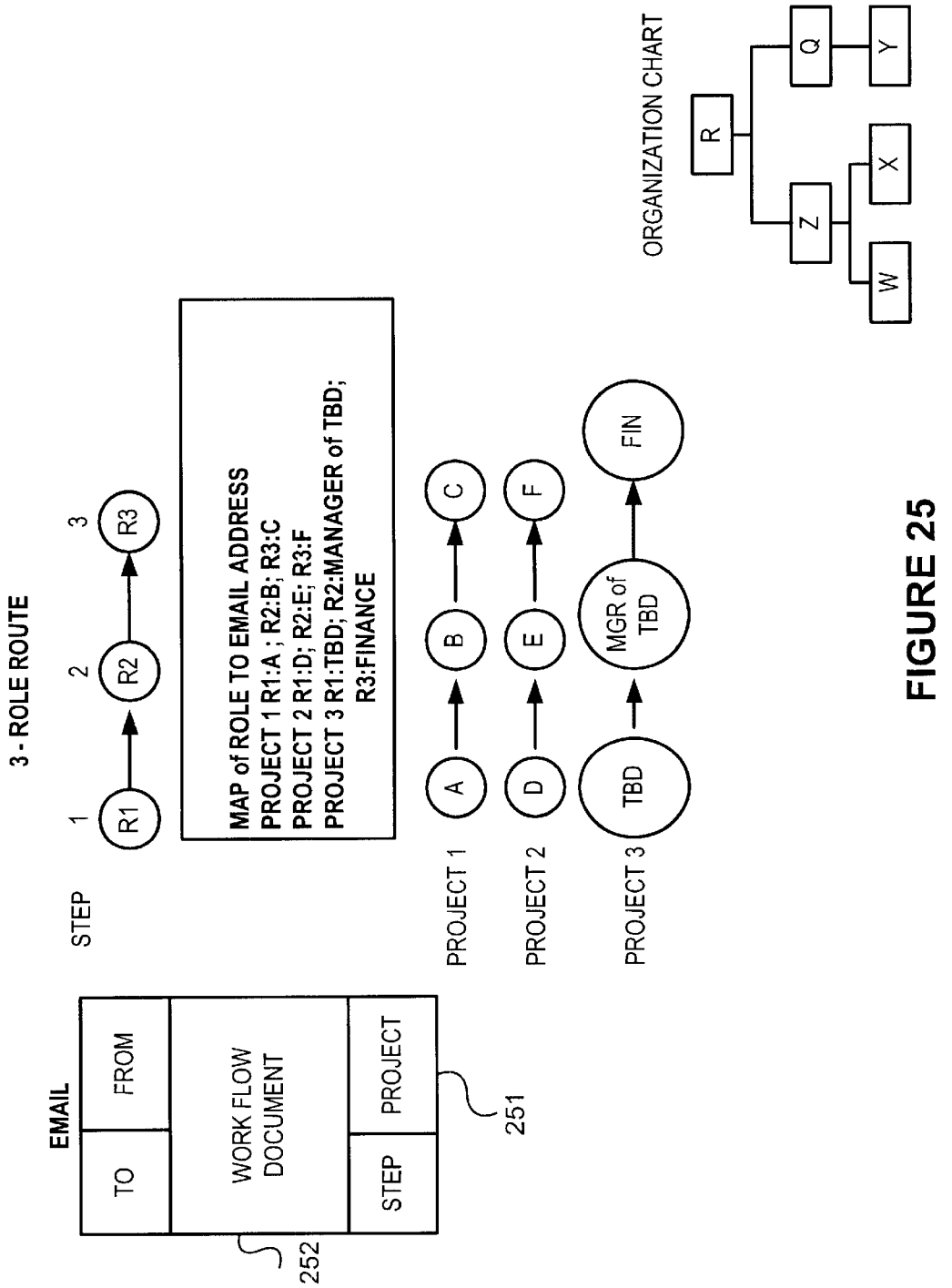
FIG. 25 is a block diagram and tables illustrating the mapping of a three-step route with the roles at each step mapped to the e-mail address based on a project identifier.

In FIG. 25, these three roles are shown as R1, R2, and R3. The e-mail 251 includes the control field PROJECT 252 which permits the selection of e-mail addresses based on the value of PROJECT. The mapping in SQL TABLE ROLE ROUTE permits the selection of the e-mail addresses based on Project 1 or Project 2 where for Project 1, R1 is e-mail address A while for Project 2, R1 is e-mail address D. The roles may be specified or may be determined based on other information such as an organization structure. The SQL TABLE ORGANIZATION illustrates the relationship of employees and managers.

| SQL TABLE ORGANIZATION: | |
| --- | --- |
| EMPLOYEE | MANAGER OF EMPLOYEE |
| W | Z |
| X | Z |
| Y | Q |
| Z | R |
| Q | R |

For Project 3, R1 is to be determined (TBD), and is the e-mail address of the initiator of the workflow. Based on TBD, R2 is selected as the e-mail address of the manager of TBD, the manager of the initiator, and R3 is the e-mail address FIN, finance or the accounting department. For example using the organization illustrated in SQL TABLE ORGANIZATION, an e-mail from employee W with PROJECT=Project 3 would be sent to the manager of employee W, Z. Similarly, an e-mail from employee Y would be sent to manager Q. The mapping table can be designed to identify alternate or backup personnel where the role table specifies a list of e-mail addresses with a selection rule. Special e-mails to the form route manager that edit the mapping table may be used to modify or to assign an alternate when a person is absent or on vacation.

In summary, the route role position may map to a list of people, each of whom may perform the process. The mapping of roles to people can be based on an organization chart. As an example, in the business travel reimbursement procedure, the traveler role may not be assigned to a specific person in the route but may be designated TBD when the e-mail is received by the forms route manager. The R2 manager role is then mapped to the user who is the manager of the traveler.

Load Balancing

Some procedure routes identify two or more people who may execute a specific process step. For a workflow tracked with LOCATION table, the form route manager can be used to make the selection of the user to balance the load among the designated people. The selection is based on rules that can be set in the form route manager. As an example, a rule can be set to send the workflow e-mail to the user with the smallest number of workflow e-mails in the LOCATION table. This mechanism, however, makes the assignment without the possibility of reassigning the e-mail to another user and implements a multi-queue and multi-server structure. Another mechanism has a queue in the form route manager and each user has no more than one workflow e-mail in the LOCATION table. When a user completes a process step and sends the e-mail to the form route manager, the form route manager can then send that user another e-mail from the queue. This implements a more effective single-queue-multi-server structure.

Advantages Associated with E-mail Systems

Some e-mail systems, such as Microsoft Exchange, have an e-mail recall function that removes unopened e-mail from the e-mail in-box of a recipient. This can recover e-mails sent to a user who is not processing workflow documents and is holding up documents in process.

Many e-mail systems provide functions that separate e-mails based on sender identification. This will provide an easy way for users to separate the workflow e-mails from their other e-mail. Sort by date and other sorts of the in-box can be used to prioritize the workflow e-mails for each user. Some e-mail systems will sort on the subject field and the form route manager can send the due date in this field. Some e-mail systems have several e-mail priorities that can be used by the business procedure to help prioritize the users' workflow e-mails. Some e-mail systems have an automated e-mail-forwarding mechanism that will permit a user to assign a second user as the recipient of the e-mails. This function forwards to the second user the e-mails addressed to the first user. This function can be used when a user goes on vacation or on an extended trip and cannot execute the process steps assigned to him. Use of the REPLY and REPLY ALL functions is essential for easy use of the e-mail based workflow system. It avoids the need for any of the users to ever enter the address of the form route manager and easily supports a backup, alternate form route manager. The e-mail systems are evolving to provide good user interfaces and functions. The e-mail based workflow system can take advantage of many of these functions and minimize the need for any special programs in the PC, terminal host, or workstation.

Advantages Associated with the Internet

Microsoft Exchange permits users to access their in-boxes using remote PC's connected by phone lines or the Internet. Microsoft Exchange also sends and receives e-mails from the Internet so the workflow users can be e-mail clients on the Internet. These e-mail system capabilities permit the form route manager to control workflow procedures that have process steps extending beyond the LAN-connected PC's, terminals, and workstations and permit the workers to have remote access and addresses anywhere on the Internet, which extends the workflow capabilities beyond the traditional boundaries of a company and permits integration of workflow among commercial trading partners. Many e-mail systems such as Lotus cc:Mail have these capabilities so implementation of the forming route manager program is not limited to Microsoft Exchange.

The workflow users of simple e-mail systems may connect to the Internet and participate in the workflow controlled by a form route manager attached somewhere on the Internet. The users need not be concerned about remembering the e-mail address of the form route manager, since the workflow e-mail is from the form route manager and the response is returned using the REPLY function. The users may participate in workflow controlled by two or more form route manager units and need not distinguish between the form route manager addresses, since the response e-mails return to the correct form route manager. The workers need only open their e-mail, set the e-mail to reply to sender, process their step, and send the modified e-mail.

Advantages Associated with the World Wide Web

In one embodiment, the workflow system can be an integration of e-mail and world wide web technologies where the form route manager is a world wide web site with e-mail capability. The e-mails from the form route manager include the URL (Universal Resource Locator, the human readable address of an Internet site or a specific web page) or IP (Internet Process, the system address of an Internet site) of the form route manager and the message from the user in the form of connections to the form route manager web site. Many e-mail systems are web browser based or integrate with browser technology. Many of these can launch a connection to a web site from a URL or IP address embedded in an e-mail. A user receives an e-mail with the URL or IP address of the form route manager web site and connects to the site by selecting the address embedded in the e-mail. The form route manager determines the step in the route and provides access to the document. The user acts on the document as a web page that is sent back to the form route manager web site. The form route manager determines the next step in the route and the e-mail address of the next user, addresses an e-mail with the embedded URL or IP address of the form route manager web site, and sends the e-mail. This process continues until the workflow route is complete.

One embodiment assigns every document in the workflow a unique URL to a web page that contains the document and a STEP field. The functions described for the e-mail based workflow system that uses e-mail are directly translated to the hybrid Internet world wide web and e-mail workflow system where the e-mails sent by the form route manager are real e-mail and the responses by the users take the form of connections and submissions of web pages to the form route manager web site. Note that the user need not know the URL of the form route manager since it is embedded in the e-mail 266. This permits the users to interact with multiple form route managers with ease since the URL address in the e-mail directs the user to the correct form route manager web site. The user e-mail in-box remains as the interface to all of the form route manager workflow servers, independent of the means by which the user sends back the message: e-mail or web connection.

Figure 26:
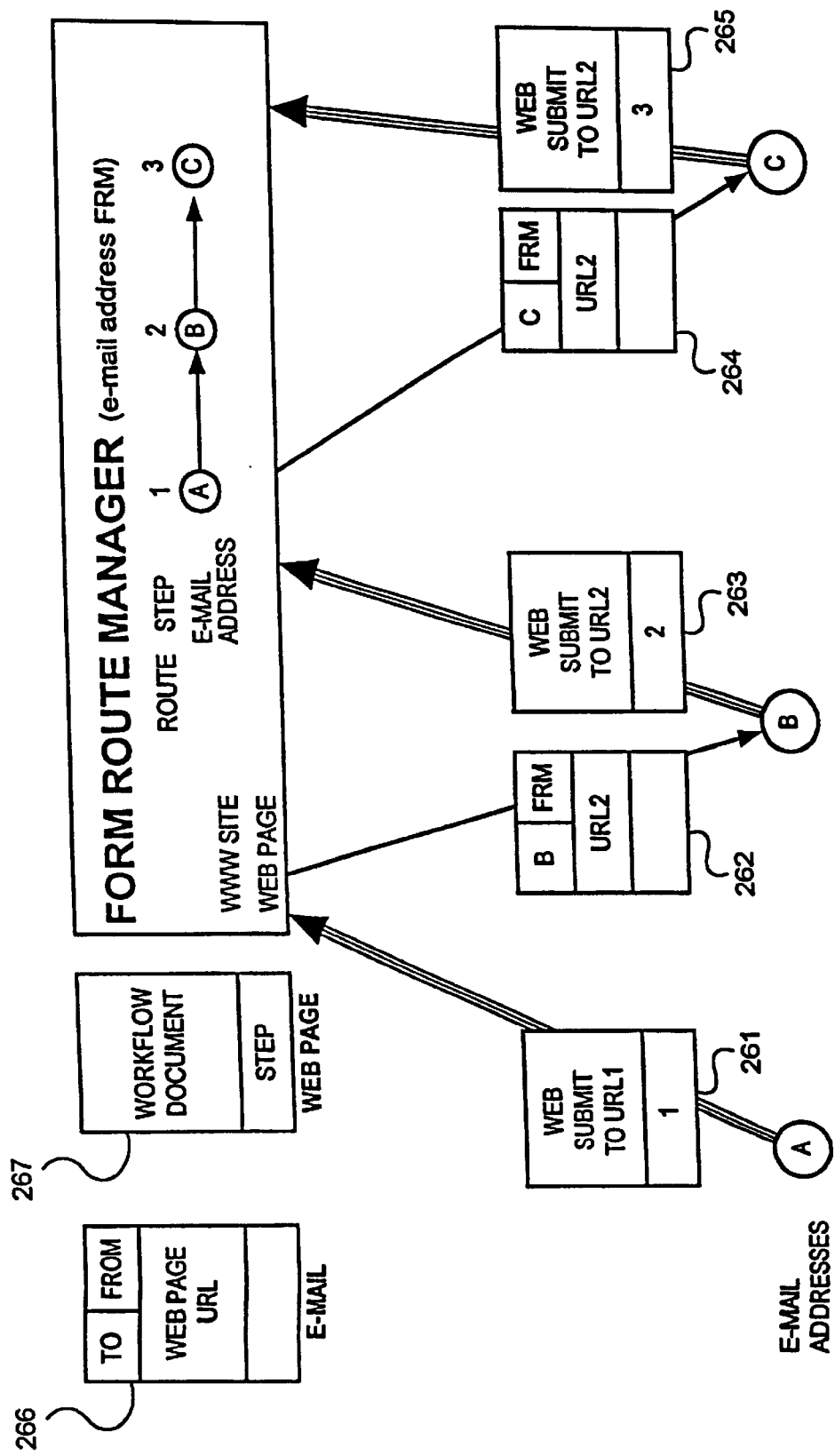
FIG. 26 is a block diagram and sequence of World Wide Web accesses and e-mails illustrating a combined web page and e-mail based workflow system.

FIG. 26 describes the operation of the hybrid e-mail world wide web workflow system. The user at e-mail address A initiates the workflow by connecting to the form route manager web site using URL1, receives a web page 267 with the initial form of the document, and starts a document on a workflow route by submitting the web page 261 back to the form route manager. The form route manager determines from the STEP field in the web page that this is the first step in the route and assigns URL2 as the URL for this document. From the route, the forms route manager determines that B is the next e-mail address, addresses the e-mail to B, updates the web page STEP field to the value of the next step, embeds URL2, the URL of the web page with this document in the form route manager web site, in the e-mail and sends the e-mail 262 to e-mail address B. A user at e-mail address B connects to the form route manager web site by selecting the embedded URL2 in the e-mail 262 and the form route manager web site sends the document to B as a web page 263. The user at e-mail address B receives the web page 263 with the document, updates the document and submits the web page 263. The form route manager receives web page 263 and determines from the STEP field and the route that e-mail address C is the next e-mail address on the route and sends a similarly constructed e-mail 264 to C including URL2 as the embedded URL. A user at e-mail address C connects to the form route manager web site using URL2, receives the web page with the document, processes the document, and submits the web page 265 to the form route manager web site. The form route manager receives the web page 265 and determines from the STEP field that the route is complete for the workflow.

Figure 27:
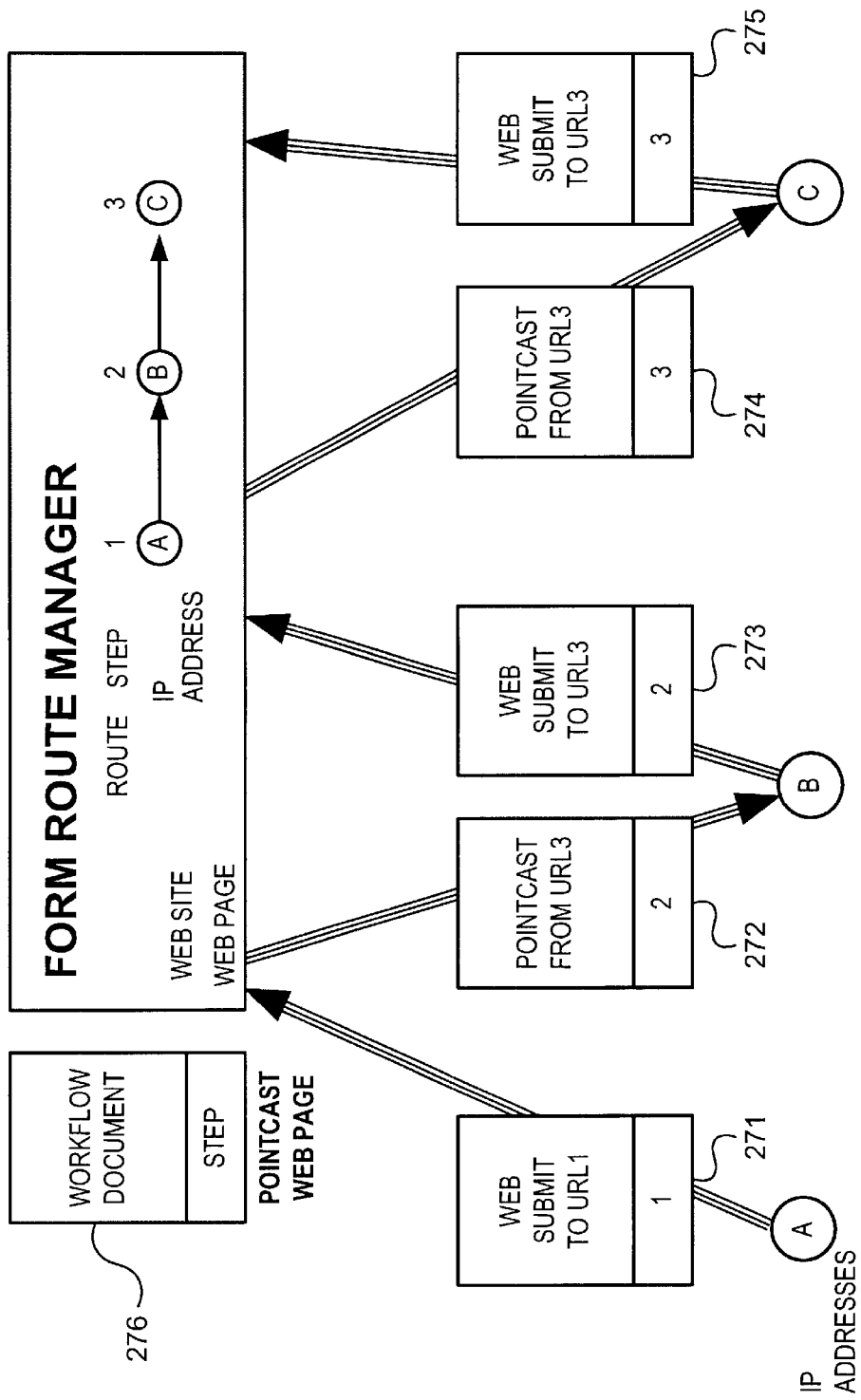
FIG. 27 is a block diagram and sequence of World Wide Web accesses and web page data transfers illustrating the use of web page technology for message based workflow system.

The message-based workflow can be further integrated into the web technology by replacing the sending of an e-mail to an e-mail address with the sending of a specific web page 276 to an IP address using Pointcast capability. Pointcast provides a mechanism for a web site to push a web page to a specific IP address or the IP address can poll the web site and pull a web page when provided by the web site. FIG. 27 illustrates one implementation of Pointcast messages from the forms route manager to send the document to a user as a web page where the user processes the document and submits the web page back to the form route manager web site. The user at IP address A submits web page 271 to the form route manager web site. The form route manager determines from STEP=1 that this is the initial document, assigns URL3 as the URL for this document, determines from the route that IP address B is the next IP address and sets STEP=2, the next step in the route, and Pointcast 272 to IP address B using URL3. The Pointcast may be the entire web page or part of a page with URL3 that appears in an in-box like web page at IP address B where the user must request the page by submitting a request to URL3. The in-box like web page can function much as the e-mail in-box to hold the workflow documents waiting for the user. The user at IP address B processes the web page and submits the web page 273 to URL3, the form route manager web site. The form route manager determines from STEP=2 and the route that the next step is 3 and the next IP address is C. The form route manager updates the STEP field to 3 and sends Pointcast 274 to IP address C. The user at IP address C processes the web page and submits the web page 275 to URL3, the form route manager web site. The form route manager determines from STEP=3 and the route that this completes the workflow for this document.

The workflow may be initiated from a library of e-mail in a folder in the e-mail system, where there is one e-mail for each workflow process and each is addressed with the e-mail address of the appropriate form route manager. These may be copied by the users and sent to the form route manager. In a hybrid, e-mail/web system, the form route manager addresses are the URL of the form route manager and the user connects to the form route manager site using this web address. The web page can have a folder of forms. These folders can be thought of as the library of forms that businesses have where each form is tailored to a specific process. For example, travel expense forms, employee address update forms, etc. Each form is a document with an underlying process. This electronic library of e-mail or web forms not only provides the document for the process but provides the initial form for the electronic route that supports the process.

The present invention permits workflow systems to have functions that in the past have been implemented only in database workflow systems, while permitting the wide participation of workers connected through e-mail messaging systems, including the Internet without requiring the PC's, terminals, or workstations of these workers to have any special program other than e-mail or a browser used with the World Wide Web. The invention eliminates the barriers that have hindered the widespread use of electronic workflow systems and will permit rapid growth of this technology, which will effectively focus the efforts of office workers for a majority of business procedures and will dramatically improve the quality of results, reduce processing time, and lower costs.

Below is the computer program listing written in Visual Basic for the form route manager designated as program FlowMan:

===========main.frm===========
Option Explicit
Private Sub ExitFlowMan( )
   If Not (objSession Is Nothing) Then Logoff
   Unload Me
End Sub
Private Sub PauseFlowMan( )
   sscmdContinue.Enabled=True 'Enable the Continue Button
   sscmdContinue.Font3D=2
   tmInbox.Enabled=False

```
    bIdle=True
    bPauseClicked=False
End Sub
Private Function StartFlowMan( ) As Boolean
    bIdle=False
    OpenAppDatabase
    If CreateSessionAndLogon Then
        ProcessInboxMessages
    End If
    If bPauseClicked Then
        PauseFlowMan
        Exit Function
    ElseIf bExitClicked Then
        ExitFlowMan
        Exit Function
    End If
    bIdle=True
    tmInbox.Enabled=True
End Function
Private Sub_Form Load( )
    bPauseClicked=False
    bExitClicked=False
    bIdle=True
    sscmdContinue.Enabled=False 'Disble the Continue Button
    sscmdContinue.Font3D=4
    sscmdPause.Enabled=Falsen'Disble the Pause Button
    sscmdPause.Font3D=4
    tmInbox.Enabled=False
    rtbInstruc.LoadFile
        ("C:\Solectron\Workflow\Dev\Flowman\instruc.txt"),
        1
    rtbInstruc.Visible=False
    rtbTerminal.LoadFile
        ("C:\Solectron\Workflow\Dev\Flowman\terminal.txt"),
        1
    rtbTerminal.Visible=False
End Sub
Private Sub Form_Unload(Cancel As Integer)
    If bIdle Or bExitClicked Then
        Exit Sub
    Else
        sscmdExit_Click
        Cancel=1
    End If
End Sub
Private Sub sscmdContinue_Click( )
    sscmdContinue.Enabled=False 'Disable the Continue Button
    sscmdContinue.Font3D=4
    sscmdPause.Enabled=True 'Enable the Pause Button
    sscmdPause.Font3D=2
    tmInbox.Enabled=False
    tmInbox.Enabled=False
    bIdle=False
    ProcessInboxMessages
    If bPauseClicked Then
        PauseFlowMan
        Exit Sub
    ElseIf bExitClicked Then
        ExitFlowMan
        Exit Sub
    End If
    bIdle=True
    tmInbox.Enabled=True
End Sub
Private Sub sscmdExit_Click( )
    If bIdle Then
        ExitFlowMan
    Else
        bExitClicked=True
    End If
End Sub
Private Sub sscmdPause_Click( )
    sscmdPause.Enabled=False 'Disable the Pause Button
    sscmdPause.Font3D=4
    If bIdle Then PauseFlowMan Else bPauseClicked=True
End Sub
Private Sub sscmdStart_Click( )
    sscmdStart.Enabled=False 'Disable the Start Button
    sscmdStart.Font3D=4
    sscmdContinue.Enabled=False 'Disable the Continue Button
    sscmdContinue.Font3D=4
    sscmdPause.Enabled=True 'Enable the Pause Button
    sscmdPause.Font3D=2
    StartFlowMan
End Sub
Private Sub tmInbox_Timer( )
    If bPauseClicked Then
        PauseFlowMan
        Exit Sub
    ElseIf bExitClicked Then
        ExitFlowMan
        Exit Sub
    End If
    tmInbox.Enabled=False
    bIdle=False
    ProcessInboxMessages
    tmInbox.Enabled=True
    bIdle=True
End Sub
===============dbutil.bas===========
Option Explicit
Private Sub ExitFlowMan( )
    If Not (obj Session Is Nothing) Then Logoff
    Unload Me
End Sub
Private Sub PauseFlowMan( )
    sscmdContinue.Enabled=True 'Enable the Continue Button
    sscmdContinue.Font3D=2
    tmInbox.Enabled=False
    bIdle=True
    bPauseClicked=False
End Sub
Private Function StartFlowMan( ) As Boolean
    bIdle=False
    OpenAppDatabase
    If CreateSessionAndLogon Then
        ProcessInboxMessages
```

```
End If
If bPauseClicked Then
    PauseFlowMan
    Exit Function
ElseIf bExitClicked Then
    ExitFlowMan
    Exit Function
End If
bIdle=True
tmInbox.Enabled=True
End Function
Private Sub Form_Load( )
    bPauseClicked=False
    bExitClicked=False
    bIdle=True
    sscmdContinue.Enabled=False 'Disble the Continue Button
    sscmdContinue.Font3D=4
    sscmdPause.Enabled=False 'Disbie the Pause Button
    sscmdPause.Font3D=4
    tmInbox.Enabled=False
    rtbInstruc.LoadFile
        ("C:\Solectron\Workflow\Dev\Flowman\instruc.txt"),
        1
    rtbInstruc.Visible=False
    rtbTerminal.LoadFile
        ("C:\Solectron\Workflow\Dev\Flowman\terminal.txt"),
        1
    rtbTerminal.Visible=False
End Sub
Private Sub Form_Unload(Cancel As Integer)
    If bIdle Or bExitClicked Then
        Exit Sub
    Else
        sscmdExit_Click
        Cancel=1
    End If
End Sub
Private Sub sscmdContinue_Click( )
    sscmdContinue.Enabled=False 'Disable the Continue Button
    sscmdContinue.Font3D=4
    sscmdPause.Enabled=True 'Enable the Pause Button
    sscmdPause.Font3D=2
    tmInbox.Enabled=False
    tmInbox.Enabled=False
    bIdle=False
    ProcessInboxMessages
    If bPauseClicked Then
        PauseFlowMan
        Exit Sub
    ElseIf bExitClicked Then
        ExitFlowMan
        Exit Sub
    End If
    bIdle=True
    tmInbox.Enabled=True
End Sub
Private Sub sscmdExit_Click( )
    If bIdle Then
        ExitFlowMan
    Else
        bExitClicked=True
    End If
End Sub
Private Sub sscmdPause_Click( )
    sscmdPause.Enabled=False 'Disable the Pause Button
    sscmdPause.Font3D=4
    If bIdle Then PauseFlowMan Else bPauseClicked=True
End Sub
Private Sub sscmdStart_Click( )
    sscmdStart.Enabled=False 'Disable the Start Button
    sscmdStart.Font3D=4
    sscmdContinue.Enabled=False 'Disable the Continue Button
    sscmdContinue.Font3D=4
    sscmdPause.Enabled=True 'Enable the Pause Button
    sscmdPause.Font3D=2
    StartFlowMan
End Sub
Private Sub tmInbox_Timer( )
    If bPauseClicked Then
        PauseFlowMan
        Exit Sub
    ElseIf bExitClicked Then
        ExitFlowMan
        Exit Sub
    End If
    tmInbox.Enabled=False
    bIdle=False
    ProcessInboxMessages
    tmInbox.Enabled=True
    bIdle=True
End Sub
================global.bas=========
Option Explicit
Public Type attachment
    file As String
    Name As String
End Type
'MAPI Objects
Public objSession As Object 'Session object
Public objRootSchemaFolder As Object
Public objThisSchemaFolder As Object
Public objThisInstanceFolder As Object
'Database Objects
Public appDatabase As Database
'Message Type Constants
Public Const INIT_MESSAGE=0
Public Const MESSAGE_ADDRESSED_TO_FLOWMAN=1
Public Const MESSAGE_FROM_RECIPIENT=2
'Node Type Constants
Public Const INIT_NODE=1
Public Const CONTROL_NODE=2
Public Const RECIPIENT_NODE=3
Public Const STOP_NODE=4
Public bPauseClicked As Boolean
Public bExitClicked As Boolean
Public bIdle As Boolean
==================maniputil.bas=========
Option Explicit
Const mapiTo=1
Private Sub CreateAttachments(objMessage As Object,
    attachmentColl As Collection,
```

```
attachNameColl As Collection, Position As Long)
    Dim objAttach As Object
    Dim count As Integer
    For count=1 To attachmentColl.count
        Set objAttach=objMessage.attachments.Add 'add the
            attachment
        With objAttach
            .Type=mapiFileData
            .Position=Position
            .Name=attachmentColl.Item(count)
            .ReadFromFile attachmentColl.Item(count)
        End With
        objAttach.Name=attachNameColl.Item(count)
        Position=Position+1
    Next
End Sub
Public Sub Logoff( )
    objSession.Logoff
End Sub
Public Sub SendMessage(messageSubject As String, mes-
    sageText As String, messageAddress As String, attach-
    mentColl As Collection, attachNameColl As Collection,
    attachmnentPosition As Long)
    Dim objRecip As Object
Dim objMessage As Object
Set objMessage=objSession.Outbox.Messages.Add
objMessage.subject=messageSubject
objMessage.Text=messageText
'create the recipient
Set objrecip=objMessage.Recipients.Add
objRecip.Name=messageAddress
objRecip.Type=mapiTo
objRecip.Resolve
'create the attachment
CreateAttachments objMessage, attachmentColl,
    attachNameColl, attachmentPosition
'send the message
objMessage.Update
objMessage.Send showDialog:=False
End Sub
Public Function CreateSessionAndLogon( ) As Boolean
    On Error GoTo err_CreateSessionAndLogon
    Set objSession=CreateObject("MAPI.Session")
    objSession.Logon ProfileName:=GetFlowManProfile,
        showDialog:=False
    CreateSessionAndLogon=True
    Exit Function
err_CreateSessionAndLogon:
    If (Err.Number=1275) Then 'VB4.0 uses "Err.Number"
        MsgBox "User pressed Cancel"
    Else
        MsgBox "Unrecoverable Error:" & Err.Description &
            Err.Source
    End If
    CreateSessionAndLogon=False
    Exit Function
End Function
    Public Function ExtractMessageHeader(objMessage As
        Object, schemaId As Long, instanceId As Long, mes-
        sageId As Long) As Boolean
    Dim strMsg As String
    Dim startPos As Long
    Dim endPos As Long
    Dim strHeader As String
    Dim schemaPos As Long
    Dim instancePos As Long
    Dim messagePos As Long
    strMsg=objMessage.Text
    startPos=InStr(strMsg, "<HEADER>")
    endPos=InStr(strMsg, "</HEADER>")
    If startPos<>0 And endPos<>0 Then
        strHeader=Mid(strMsg, startPos+8, endPos-startPos-
            8)
        schemaPos=InStr(strHeader, "Schema")
        instancePos=InStr(strHeader, "Instance")
        messagePos=InStr(strHeader, "MessageId")
        If schemaPos<>0 And instancePos<>0 And message-
            Pos<>0 Then
            schemaId=Val(Mid(strHeader, schemaPos+6,
                instancePos-schemaPos-6))
            instanceId=Val(Mid(strHeader, instancePos+8,
                messagePos-instancePos-8))
            messageId=Val(Mid(strHeader, messagePos+9))
            ExtractMessageHeader=True
        Else
            ExtractMessageHeader=False
        End If
    Else
        ExtractMessageHeader=False
    End If
End Function
Public Sub OnReceiveInitMessage(objMessage As Object,
    schemaId As Long, instanceId As Long, messageId As
    Long)
    SendAllMsgFromStartNode schemaId, instanceId
End Sub
Public Sub OnReceiveMessageToFlowman(objMessage As
    Object, schemaId As Long, instanceId As Long, mes-
    sageId As Long)
    Dim nodeId As Long
    nodeId=FindToNodeId(messageId)
    UpdateNodeStatus messageId, instanceId, nodeId
    SendAllMsgFromNode nodeId, schemaId, instanceId
End Sub
Public Sub OnReceiveMessageFromRecipient(objMessage
    As Object, schemaId As Long, instanceId As Long, mes-
    sageId As Long)
    Dim nodeId As Long
    nodeId=FindToNodeId(messageId)
    SendAllMsgFromRecipientNode objMessage, nodeId,
        schemaId, instanceId
End Sub
Public Sub OnReceiveMessage(objMessage As Object,
    schemaId As Long, instanceId As Long, messageId As
    Long)
    Dim msgType As Long
    msgType=FindMessageType(messageId)
    Select Case msgType
    Case INIT_MESSAGE
        OnReceiveInitMessage objMessage, schemaId,
            instanceId, messageId
    Case MESSAGE_ADDRESSED_TO_FLOWMAN
        OnReceiveMessageToFlowman objMessage,
            schemaId, instanceId, messageId
    Case MESSAGE_FROM_RECIPIENT
```

```
      OnReceiveMessageFromRecipient objMessage,
         schemaId, instanceId, messageId
   End Select
End Sub
Public Sub ProcessInboxMessages( )
   Dim objInboxFolder As Object 'Folder object
   Dim objInMessages As Object 'Messages collection
   Dim objInMessage As Object 'Message object
   Dim schemaId As Long
   Dim instanceId As Long
   Dim messageId As Long
   Set objInboxFolder=objSession.Inbox
   Set objInMessages=objInboxFolder.Messages
On Error GoTo error_olemsg
   If objInMessages Is Nothing Then
      MsgBox "must select a messages collection"
      Exit Sub
   End If
   Set objInMessage=objInMessages.GetFirst
   While Not objInMessage Is Nothing 'loop through all
      messages
      If True=objInMessage.Unread Then
         ExtractMessageHeader objInMessage, schemaId,
            instanceId, messageId
         If CheckOpenInstance(instanceId) Then
            OnReceiveMessage objInMessage, schemaId,
               instanceId, messageId
            CopyMessageToFolder objInMessage, schemaId,
               instanceId
         Else
            objInMessage.Delete
         End If
      End If
      Set objInMessage=objInMessages.GetNext
   Wend
   Exit Sub
error_olemsg:
   MsgBox "Error" & Str(Err) & ":" & Error$(Err)
   Resume Next
End Sub
================util.bas============
Option Explicit
Const mapiTo=1
Private Sub CreateAttachments(objMessage As Object,
   attachmentColl As Collection, attachNameColl As
   Collection, Position As Long)
   Dim objAttach As Object
   Dim count As Integer
   For count=1 To attachmentColl.count
      Set objAttach=objMessage.attachments.Add 'add the
         attachment
      With objAttach
         .Type=mapiFileData
         .Position=Position
         .Name=attachmentColl.Item(count)
         .ReadFromFile attachmentColl.Item(count)
      End With
      objAttach.Name=attachNameColl.Item(count)
      Position=Position+1
   Next
End Sub
Public Sub Logoff( )
   objSession.Logoff
End Sub
Public Sub SendMessage(messageSubject As String, mes-
   sageText As String, messageAddress As String, attach-
   mentColl As Collection, attachNameColl As Collection,
   attachmentPosition As Long)
   Dim objRecip As Object
   Dim objMessage As Object
   Set objMessage=objSession.Outbox.Messages.Add
   objMessage.subject=messageSubject
   objMessage.Text=messageText
   'create the recipient
   Set objRecip=objMessage.Recipients.Add
   objRecip.Name=messageAddress
   objRecip.Type=mapiTo
   objRecip.Resolve
   'create the attachment
   CreateAttachments objMessage, attachmentColl,
      attachNameColl, attachmentPosition
   'send the message
   objMessage.Update
   objMessage.Send showDialog:=False
End Sub
Public Function CreateSessionAndLogon( ) As Boolean
   On Error GoTo err_CreateSessionAndLogon
   Set objSession=CreateObject("MAPI.Session")
   objSession.Logon ProfileName:=GetFlowManProfile.
      showDialog:=False
   CreateSessionAndLogon=True
   Exit Function
err_CreateSessionAndLogon:
   If (Err.Number=1275) Then 'VB4.0 uses "Err.Number"
      MsgBox "User pressed Cancel"
   Else
      MsgBox "Unrecoverable Error:" & Err.Description &
         Err.Source
   End If
   CreateSessionAndLogon=False
   Exit Function
End Function
Public Function ExtractMessageHeader(objMessage As
   Object, schemaId As Long, instanceId As Long, mes-
   sageId As Long) As Boolean
   Dim strMsg As String
   Dim startPos As Long
   Dim endPos As Long
   Dim strHeader As String
   Dim schemaPos As Long
   Dim instancePos As Long
   Dim messagePos As Long
   strMsg=objMessage.Text
   startPos=InStr(strMsg, "<HEADER>")
   endPos=InStr(strMsg, "</HEADER>")
   If startPos<>0 And endPos<>0 Then
      strHeader=Mid(strMsg, startPos+8, endPos-startPos-
         8)
      schemaPos=InStr(strHeader, "Schema")
      instancePos=InStr(strHeader, "Instance")
      messagePos=InStr(strHeader, "MessageId")
      If schemaPos<>0 And instancePos<>0 And message-
         Pos<>0 Then
```

```
        schemaId=Val(Mid(strHeader, schemaPos+6,
            instancePos-schemaPos-6))
        instanceId=Val(Mid(strHeader, instancePos+8,
            messagePos-instancePos-8))
        messageId=Val(Mid(strHeader, messagePos+9))
        ExtractMessageHeader=True
    Else
        ExtractMessageHeader=False
    End If
Else
    ExtractMessageHeader=False
End If
End Function
Public Sub OnReceiveInitMessage(objMessage As Object,
    schemaId As Long, instanceId As Long, messageId As
    Long)
    SendAllMsgFromStartNode schemaId, instanceId
End Sub
Public Sub OnReceiveMessageToFlowman(objMessage As
    Object, schemaId As Long, instanceId As Long, mes-
    sageId As Long)
    Dim nodeId As Long
    nodeId=FindToNodeId(messageId)
    UpdateNodeStatus messageId, instanceId, nodeId
    SendAllMsgFromNode nodeId, schemaId, instanceId
End Sub
Public Sub OnReceiveMessageFromRecipient(objMessage
    As Object, schemaId As Long, instanceId As Long, mes-
    sageId As Long)
    Dim nodeId As Long
    nodeId=FindToNodeId(messageId)
    SendAllMsgFromRecipientNode objMessage, nodeId,
        schemaId, instanceId
End Sub
Public Sub OnReceiveMessage(objMessage As Object,
    schemaId As Long, instanceId As Long, messageId As
    Long)
    Dim msgType As Long
    msgType=FindMessageType(messageId)
    Select Case msgType
        Case INIT_MESSAGE
            OnReceiveInitMessage objMessage, schemaId,
                instanceId, messageId
        Case MESSAGE_ADDRESSED_TO_FLOWMAN
            OnReceiveMessageToFlowman objMessage,
                schemaId, instanceId, messageId
        Case MESSAGE_FROM_RECIPIENT
            OnReceiveMessageFromRecipient objMessage,
                schemaId, instanceId, messageId
    End Select
End Sub
Public Sub ProcessInboxMessages( )
    Dim objInboxFolder As Object 'Folder object
    Dim objInMessages As Object 'Messages collection
    Dim objInMessage As Object 'Message object
    Dim schemaId As Long
    Dim instanceId As Long
    Dim messageId As Long
    Set objInboxFolder=objSession.Inbox
    Set objInMessages=objInboxFolder.Messages
    On Error GoTo error_olemsg
    If objInMessages Is Nothing Then
        MsgBox "must select a messages collection"
        Exit Sub
    End If
    Set objInMessage=objInMessages.GetFirst
    While Not objInMessage Is Nothing 'loop through all
        messages
        If True=objInMessage.Unread Then
            ExtractMessageHeader objInMessage, schemaId,
                instanceId, messageId
            If CheckOpenInstance(instanceId) Then
                OnReceiveMessage objInMessage, schemaId,
                    instanceId, messageId
                CopyMessageToFolder objInMessage, schemaId,
                    instanceId
            Else
                objInMessage.Delete
            End If
        End If
        Set objInMessage=objInMessages.GetNext
    Wend
    Exit Sub
error_olemsg:
    MsgBox "Error " & Str(Err) & ":" & Error$(Err)
    Resume Next
End Sub
```

What is claimed:

1. A form route manager in a computer network with access to an e-mail system, the form route manager comprising:
a sequenced list of e-mail addresses corresponding to a plurality of e-mail addresses in the computer network; and
means for determining if an e-mail received in the e-mail system originates from the last e-mail address in the sequenced list, and if so, deleting the e-mail, and if not, sending the e-mail to the next e-mail address in the sequenced list.

2. The form route manager of claim 1, wherein the e-mail contains a step field that indicates a position in the sequenced list of e-mail addresses wherein the step field is updated to the next position in the sequenced list when the e-mail is to be sent to the next e-mail address.

3. The form route manager of claim 1, further comprising a second sequenced list of e-mail addresses, wherein each sequenced list of e-mail addresses has a unique list identifier, and the e-mail contains a route field containing the list identifier of one of the sequenced lists which the form route manager uses to determine the next e-mail address.

4. The form route manager of claim 1, wherein the e-mail contains a document identifier and the form route manager provides a location table with the current e-mail address of the e-mail with the document identifier and a move history table with the sequenced list of e-mail addresses in which the e-mail with the document identifier had been sent.

5. The form route manager of claim 4, wherein the form route manager receives an e-mail with a document identifier and a status request message from an e-mail address and the form route manager sends an e-mail containing information related to the e-mail with the document identifier from the location table and the move history table to the e-mail address.

6. The form route manager of claim 4, wherein a new sequenced list of e-mail addresses is derived from the sequenced list of e-mail addresses in the move history table for an e-mail with a document identifier.

7. The form route manager of claim 1, wherein an e-mail address in the sequenced list of e-mail addresses has two successor e-mail addresses each with a unique branch route identifier, the e-mail contains a branch indicator field containing a branch route identifier and the form route manager selects as the next e-mail address the e-mail address as with the branch route identifier that matches the contents of the branch indicator field.

8. The form route manager of claim 1, wherein the e-mail contains a route modifier field, which contains an e-mail address and the form route manager selects the e-mail address in the route modifier field as the next e-mail address.

9. The form route manager of claim 1, wherein an e-mail address in the sequenced list of e-mail addresses has two successor e-mail addresses and the form route manager selects the first of the two successor e-mail address as the next address of the e-mail and selects the second of the two successor e-mail address as the next address of a copy of the e-mail.

10. The form route manager of claim 1, wherein an e-mail address in the sequenced list of e-mail addresses has two predecessor e-mail addresses and the form route manager provides a unique receipt indicator for each predecessor e-mail address indicating that an e-mail was received from a corresponding e-mail address and a rules storage wherein a rule relating the states of the receipt indicators determines if the e-mail is to be sent to the next e-mail address in the sequenced list of e-mail addresses.

11. The form route manager of claim 1, wherein the form route manager provides a timer that is started when an e-mail is sent to an e-mail address and detects a fault if the e-mail address does not send back the e-mail before the timer exceeds a predetermined time period.

12. The form route manager of claim 1, wherein the sequenced list of e-mail addresses, is contained in a table of a database.

13. The form route manager of claim 12, wherein the table is a SQL table in a relational database.

* * * * *